(12) United States Patent
Narahara et al.

(10) Patent No.: US 9,813,771 B2
(45) Date of Patent: *Nov. 7, 2017

(54) INFORMATION PROCESSING APPARATUS, INFORMATION PROCESSING METHOD AND PROGRAM

(71) Applicant: Saturn Licensing LLC, New York, NY (US)

(72) Inventors: Tatsuya Narahara, Kanagawa (JP); Nobuyuki Fujiwara, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/536,933

(22) Filed: Nov. 10, 2014

(65) Prior Publication Data
US 2015/0067735 A1    Mar. 5, 2015

Related U.S. Application Data

(63) Continuation of application No. 12/135,184, filed on Jun. 8, 2008, now Pat. No. 8,887,201.

(30) Foreign Application Priority Data

Jun. 7, 2007  (JP) ............................. P2007-151651

(51) Int. Cl.
*H04N 21/482*  (2011.01)
*H04N 21/426*  (2011.01)
(Continued)

(52) U.S. Cl.
CPC ....... *H04N 21/4826* (2013.01); *G11B 27/105* (2013.01); *G11B 27/34* (2013.01);
(Continued)

(58) Field of Classification Search
CPC ......... H04N 21/4826; H04N 21/42646; H04N 21/4828; H04N 21/4668; H04N 21/6175;
(Continued)

(56) References Cited

U.S. PATENT DOCUMENTS 5,805,763 A * 9/1998 Lawler ............... H04N 5/44543
725/40
6,363,380 B1 3/2002 Dimitrova
(Continued)

FOREIGN PATENT DOCUMENTS

CN     1298522 A    6/2001
CN     1833437 A    9/2006
(Continued)

OTHER PUBLICATIONS

Office Action dated Jul. 7, 2011 by Japan Patent Office in corresponding Japanese Patent Application No. 2007-151651 (3 pages).
(Continued)

*Primary Examiner* — Hai V Tran
(74) *Attorney, Agent, or Firm* — Lerner, David, Littenberg, Krumholz & Mentlik, LLP

(57) ABSTRACT

An information processing apparatus includes: an acquiring means for acquiring focused content information that is information relating to a predetermined content and includes at least any one of descriptions of the predetermined content having information displayed on a display means, a word related to the descriptions, a genre, a title, and cast of the predetermined content; a retrieving means for using content information about the other content that includes at least any one of descriptions of the other content different from the predetermined content, a genre, a title, and cast of the other content and the acquired focused content information to retrieve a content having a high degree of relation to focused content information in the other contents; and a specification
(Continued)

information generating means for generating specification information that specifies the resulted content of retrieval based on the result of retrieval done by the retrieving means.

8 Claims, 17 Drawing Sheets

(51) Int. Cl.
  *H04N 21/466* (2011.01)
  *G11B 27/10* (2006.01)
  *G11B 27/34* (2006.01)
  *H04N 5/445* (2011.01)
  *H04N 5/76* (2006.01)
  *H04L 29/06* (2006.01)
  *H04N 21/61* (2011.01)
  *H04N 5/765* (2006.01)
  *H04N 5/775* (2006.01)

(52) U.S. Cl.
  CPC ....... *H04L 65/602* (2013.01); *H04N 5/44513* (2013.01); *H04N 5/76* (2013.01); *H04N 21/42646* (2013.01); *H04N 21/4668* (2013.01); *H04N 21/4828* (2013.01); *H04N 21/6175* (2013.01); *H04N 21/6193* (2013.01); *H04N 5/765* (2013.01); *H04N 5/775* (2013.01)

(58) Field of Classification Search
  CPC ............. H04N 21/6193; H04N 21/466; H04N 21/4532; H04N 21/2472
  See application file for complete search history.

(56) References Cited

U.S. PATENT DOCUMENTS

| | | | |
|---|---|---|---|
| 6,819,863 | B2 | 11/2004 | Dagtas et al. |
| 7,783,419 | B2 | 8/2010 | Taniguchi et al. |
| 2005/0028194 | A1 | 2/2005 | Elenbaas et al. |
| 2005/0144499 | A1 | 6/2005 | Narahara et al. |
| 2005/0195430 | A1 | 9/2005 | Shinohara et al. |
| 2007/0186241 | A1 | 8/2007 | Sugimoto et al. |
| 2008/0086456 | A1* | 4/2008 | Rasanen ............ H04N 21/4782 725/86 |
| 2011/0090402 | A1* | 4/2011 | Huntington ........ H04N 5/44543 348/564 |

FOREIGN PATENT DOCUMENTS

| | | |
|---|---|---|
| JP | 09-322089 | 12/1997 |
| JP | 2001003684 A | 1/2001 |
| JP | 2001-38646 | 2/2001 |
| JP | 2001036846 A | 2/2001 |
| JP | 2003-18492 | 1/2003 |
| JP | 2003-229903 | 8/2003 |
| JP | 2004-151651 | 5/2004 |
| JP | 2004-222030 | 8/2004 |
| JP | 2005-167628 | 8/2005 |
| JP | 2006024196 A | 1/2006 |
| JP | 2006-319680 | 11/2006 |
| JP | 2006-345376 | 12/2006 |
| WO | WO 2005/122579 | 12/2005 |

OTHER PUBLICATIONS

Search Report filed in counterpart Chinese Application No. 2008101099220.0 dated Jun. 10, 2008.

* cited by examiner

FIG. 8

CONTENT INFORMATION

| TITLE | SABA'S GOLF |
|---|---|
| GENRE | VARIETY |
| DETAIL | (DESCRIPTIONS)<br>SABA AND TAKEO PLAY GOLF IN HODOGAYA....<br>(CAST)<br>SABA, TAKEO |

APPEARANCE FREQUENCY INFORMATION

| WORD | FREQUENCY OF APPEARANCE |
|---|---|
| SABA | 3 |
| TAKEO | 2 |
| GOLF | 2 |
| ... | ... |

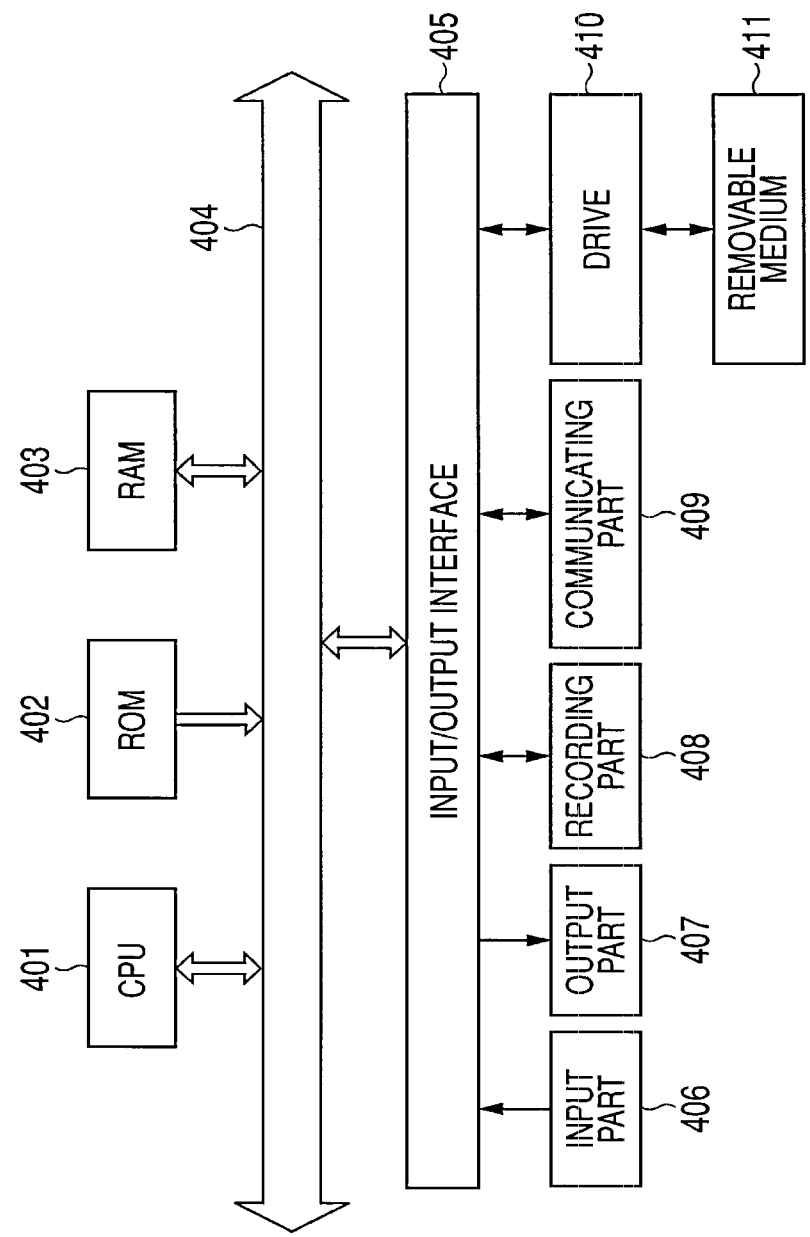

INFORMATION PROCESSING APPARATUS, INFORMATION PROCESSING METHOD AND PROGRAM

CROSS REFERENCES TO RELATED APPLICATIONS

This application is a continuation of U.S. patent application Ser. No. 12/135,185 filed Jun. 8, 2008, which contains subject matter related to Japanese Patent Application JP 2007-151651 filed in the Japanese Patent Office on Jun. 7, 2007. The disclosure of the above-referenced applications is expressly incorporated herein by reference in its entirety.

BACKGROUND OF THE INVENTION

1. Field of the Invention

The present invention relates to an information processing apparatus, an information processing method, and a program, particularly to an information processing apparatus, an information processing method, and a program, which present information relating to contents so that a content in which a user is interested can be readily found.

2. Description of the Related Art

Heretofore, such a recording and reproducing apparatus is known that retrieves contents estimated as user's favorites among contents to be broadcast from now on based on the user's viewing history of contents and a list of contents resulted from the retrieval is displayed on a display device. Some of these recording and reproducing apparatuses use a history analogue to a user's viewing history among a plurality of the other users' viewing histories for summarization to perform cooperative filtering process, and then generate a list of contents recommended for that user (for example, see Patent Reference 1 (JP-A-2005-167628)).

As described above, the recording and reproducing apparatus generates a list of contents recommended for a user and displays the generated list, whereby contents thought as user's favorites can be recommended for that user. In addition, the user sees the list of the contents displayed in this manner to find an interested content from the displayed list, and then watches the content or makes a preselect for recording the content.

SUMMARY OF THE INVENTION

However, in the technique described above, the contents related to the contents watched by a user in the past are selected and displayed in a list. Thus, it is sometimes difficult for the user to find an interested content from the displayed list.

In other words, a content in which a user may express his/her interest and desire to watch is varied at different times. Therefore, in the case in which the user desires to watch a content less related to the contents that the user frequently watches, or in the case in which the user desires to watch a content newly attracting user's interest in which the user has not been interested before, the user may not sometimes find a content that the user desires to watch from a displayed list.

For example, in the case in which a user expresses interest in the descriptions of the content now watching and desires to find the other contents related to these descriptions, even though the list of the contents selected and recommended by the recording and reproducing apparatus is displayed, the contents shown by the list are sometimes only the contents with no relation to the contents watched right before the list is displayed. Thus, it is sometimes difficult for the user to find the contents related to the descriptions which newly attract user's interest.

In addition, depending on the recording and reproducing apparatuses, some of apparatuses have a function that uses a soft keyboard to input a word and retrieves the contents related to the word based on the inputted word. However, it is necessary for a user to input words one by one with the soft keyboard.

It is desirable to allow information relating to contents to be presented so that a content in which a user is interested can be readily found.

An information processing apparatus according to an embodiment of the invention is an information processing apparatus including: an acquiring means for acquiring focused content information that is information relating to a predetermined content and includes at least any one of descriptions of the predetermined content having information displayed on a display means, a word related to the descriptions, a genre, a title, and cast of the predetermined content; a retrieving means for using content information about the other content that includes at least any one of descriptions of the other content different from the predetermined content, a genre, a title, and cast of the other content and the acquired focused content information to retrieve a content having a high degree of relation to focused content information in the other contents; and a specification information generating means for generating specification information that specifies the resulted content of retrieval based on the result of retrieval done by the retrieving means.

The information processing apparatus may further include a display control means for controlling display of the specification information on the display means.

The information processing apparatus may further include a process control means for controlling execution of any one of a process for watching a content specified by the displayed specification information, a process for making a preselect for watching, a process for recording, a process for making a preselect for recording, and a process for purchase in accordance with a user instruction.

In the information processing apparatus, the display control means may further control display of information relating to each of a plurality of contents on the display means, and the acquiring means may acquire focused content information about a content indicated by a single selected item of the information in a plurality of items of the displayed information.

An information processing method or a program according to an embodiment of the invention is an information processing method or a program that allows a computer to execute a process including the steps of: acquiring focused content information that is information relating to a predetermined content and includes at least any one of descriptions of the predetermined content having information displayed on a display means, a word related to the descriptions, a genre, a title, and cast of the predetermined content; using content information about the other content that includes at least any one of descriptions of the other content different from the predetermined content, a genre, a title, and cast of the other content and the acquired focused content information to retrieve a content having a high degree of relation to focused content information in the other contents by a retrieving means; and generating specification information that specifies the resulted content of retrieval based on the result of retrieval done by the retrieving means.

According to the embodiment of the invention, focused content information is acquired that is information relating to a predetermined content and includes at least any one of descriptions of the predetermined content having information displayed on a display means, a word related to the descriptions, a genre, a title, and cast of the predetermined content; content information about the other content that includes at least any one of descriptions of the other content different from the predetermined content, a genre, a title, and cast of the other content and the acquired focused content information are used to retrieve the contents having a high degree of relation to focused content information in the other content by a retrieving means; and based on the result of retrieval done by the retrieving means, specification information is generated that specifies the resulted content of retrieval done by the retrieving means.

According to the embodiment of the invention, information relating to contents can be presented. Particularly, according to the embodiment of the invention, information relating to contents can be presented so that a content in which a user is interested can be readily found.

BRIEF DESCRIPTION OF THE DRAWINGS

FIG. 8 shows a diagram depicting exemplary items of content information and appearance frequency information;

FIG. 17 shows a block diagram depicting an exemplary configuration of a computer.

DESCRIPTION OF PREFERRED EMBODIMENTS

Hereinafter, embodiments of the invention will be described. The following is examples of the correspondence between configuration requirements for the invention and the embodiments of the specification or the drawings. This is described for confirming that the embodiments supporting the invention are described in the specification or the drawings. Therefore, even though there is an embodiment that is described in the specification or the drawings but is not described herein as an embodiment corresponding to configuration requirements for the invention, it does not mean that the embodiment does not correspond to those configuration requirements. Contrary to this, even though an embodiment is described herein as an embodiment corresponding to configuration requirements, it does not mean that the embodiment does not correspond to configuration other than the configuration requirements.

Figure 5:
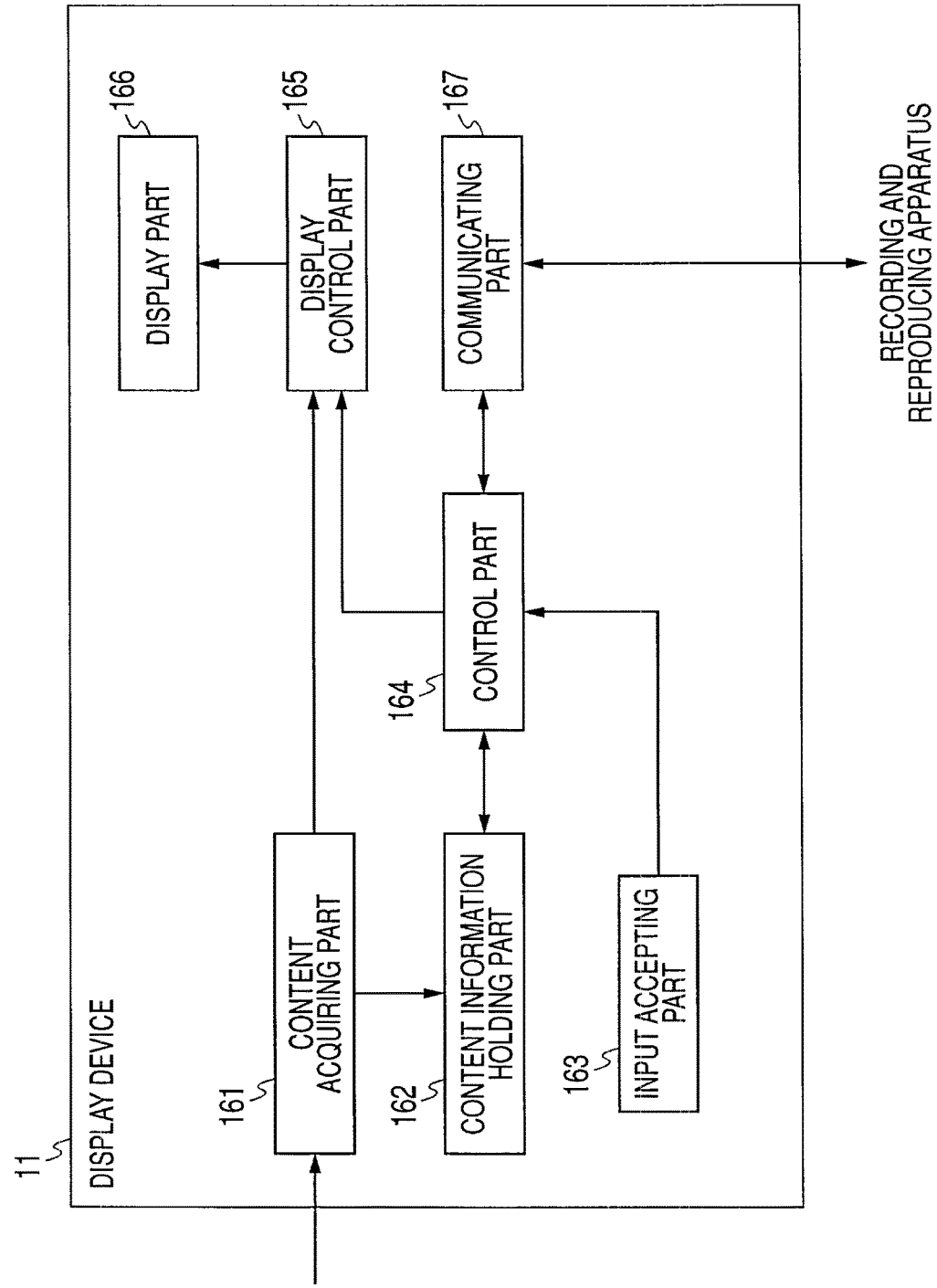
FIG. 5 shows a block diagram depicting an exemplary configuration of a display device.
Figure 6:
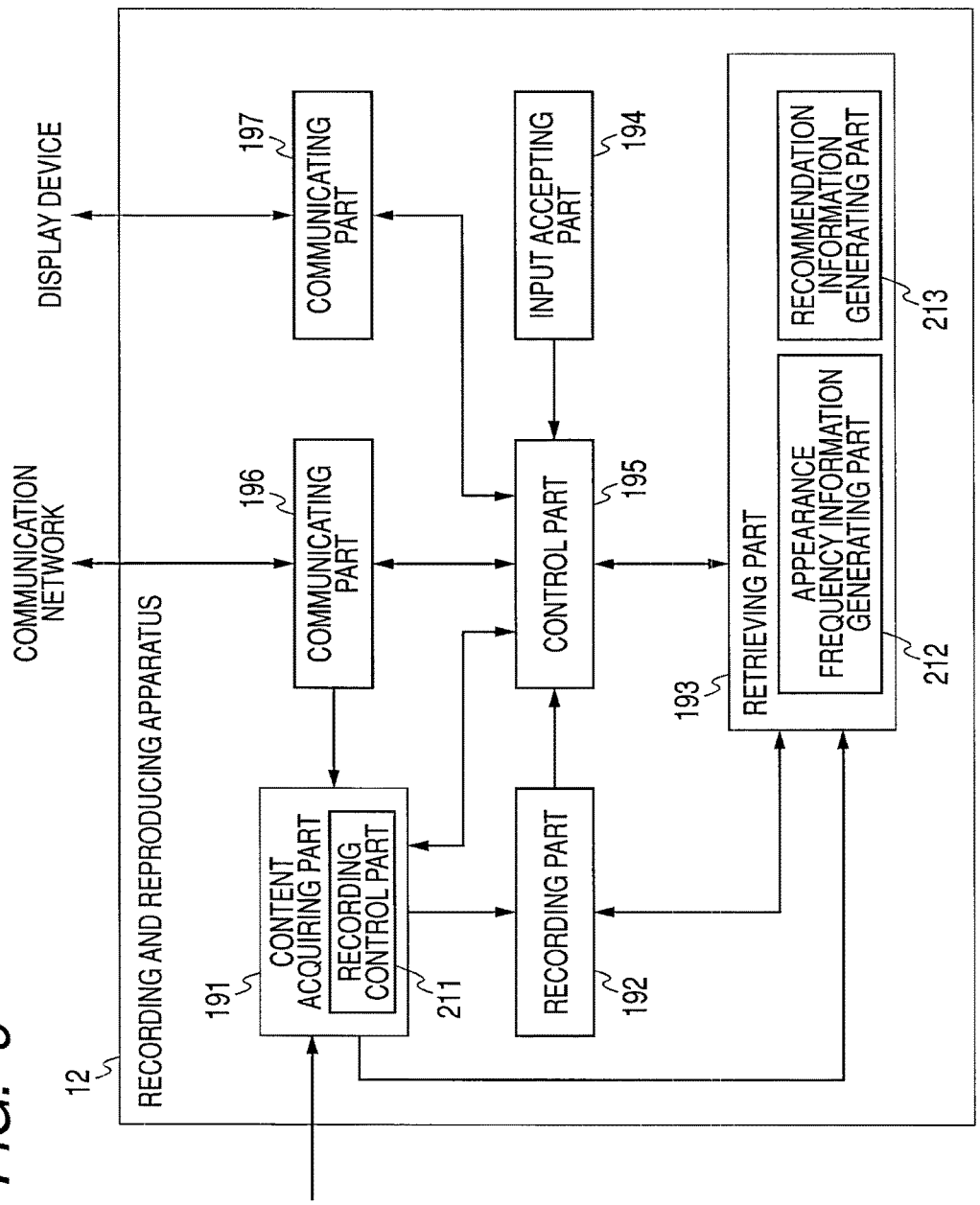
FIG. 6 shows a block diagram depicting an exemplary configuration of a recording and reproducing apparatus.

An information processing apparatus according to an embodiment of the invention is an information processing apparatus including: an acquiring means (for example, a communicating part 197 shown in FIG. 6) for acquiring focused content information that is information relating to a predetermined content and includes at least any one of descriptions of the predetermined content having information displayed on a display means (for example, a display part 166 shown in FIG. 5), a word related to the descriptions, a genre, a title, and cast of the predetermined content; a retrieving means (for example, a retrieving part 193 shown in FIG. 6) for using content information about the other content that includes at least any one of descriptions of the other content different from the predetermined content, a genre, a title, and cast of the other content and the acquired focused content information to retrieve a content having a high degree of relation to focused content information in the other contents; and a specification information generating means (for example, a recommendation information generating part 213 shown in FIG. 6) for generating specification information that specifies the resulted content of retrieval based on the result of retrieval done by the retrieving means.

The information processing apparatus may further include a display control means (for example, a display control part 165 shown in FIG. 5) for controlling display of the specification information on the display means.

The information processing apparatus may further include a process control means (for example, a control part 164 shown in FIG. 5 or a control part 195 shown in FIG. 6) for controlling execution of any one of a process for watching a content specified by the displayed specification information, a process for making a preselect for watching, a process for recording, a process for making a preselect for recording, and a process for purchase in accordance with a user instruction.

Figure 9:
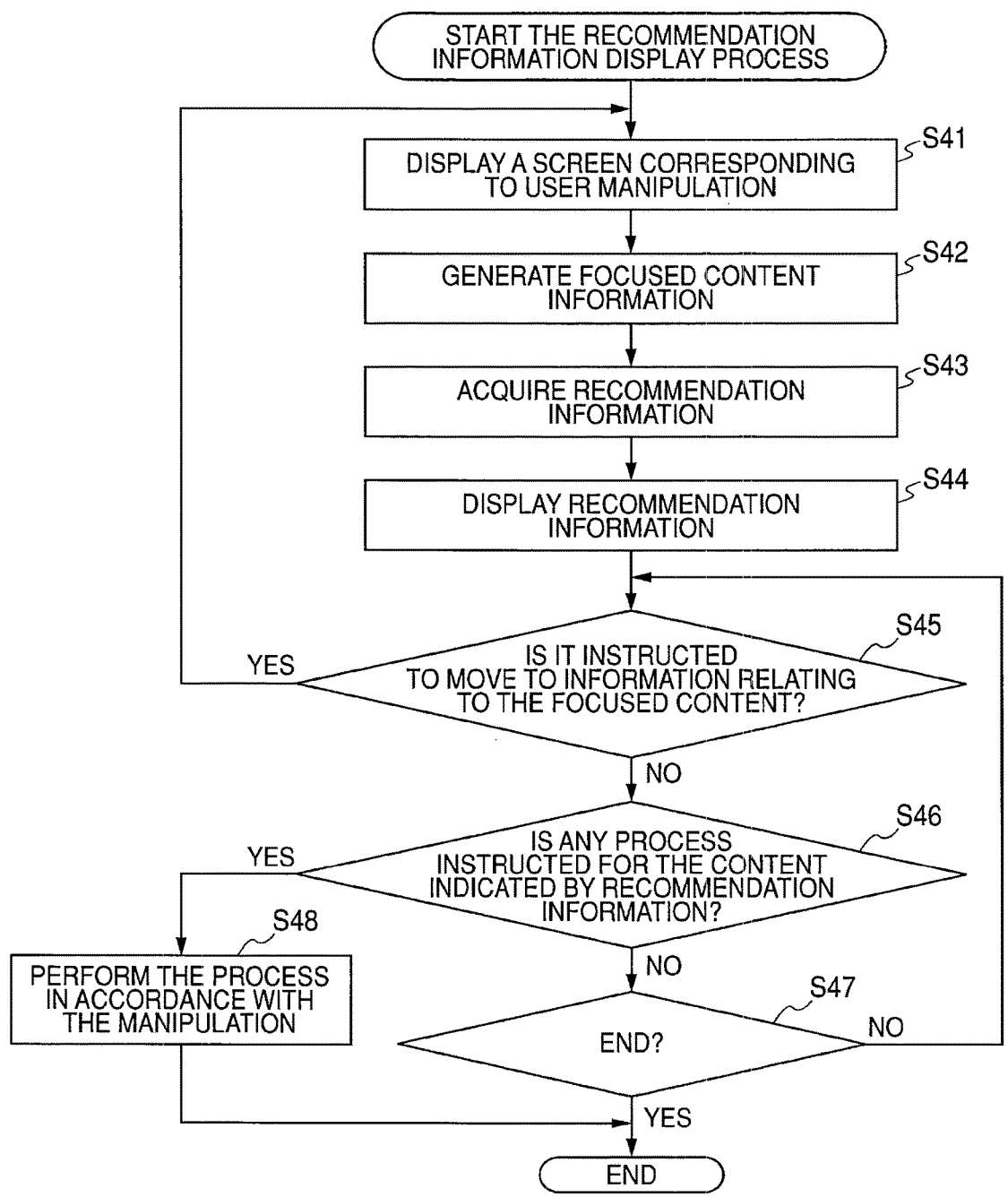
FIG. 9 shows a flowchart illustrative of a recommendation information display process.
Figure 10:
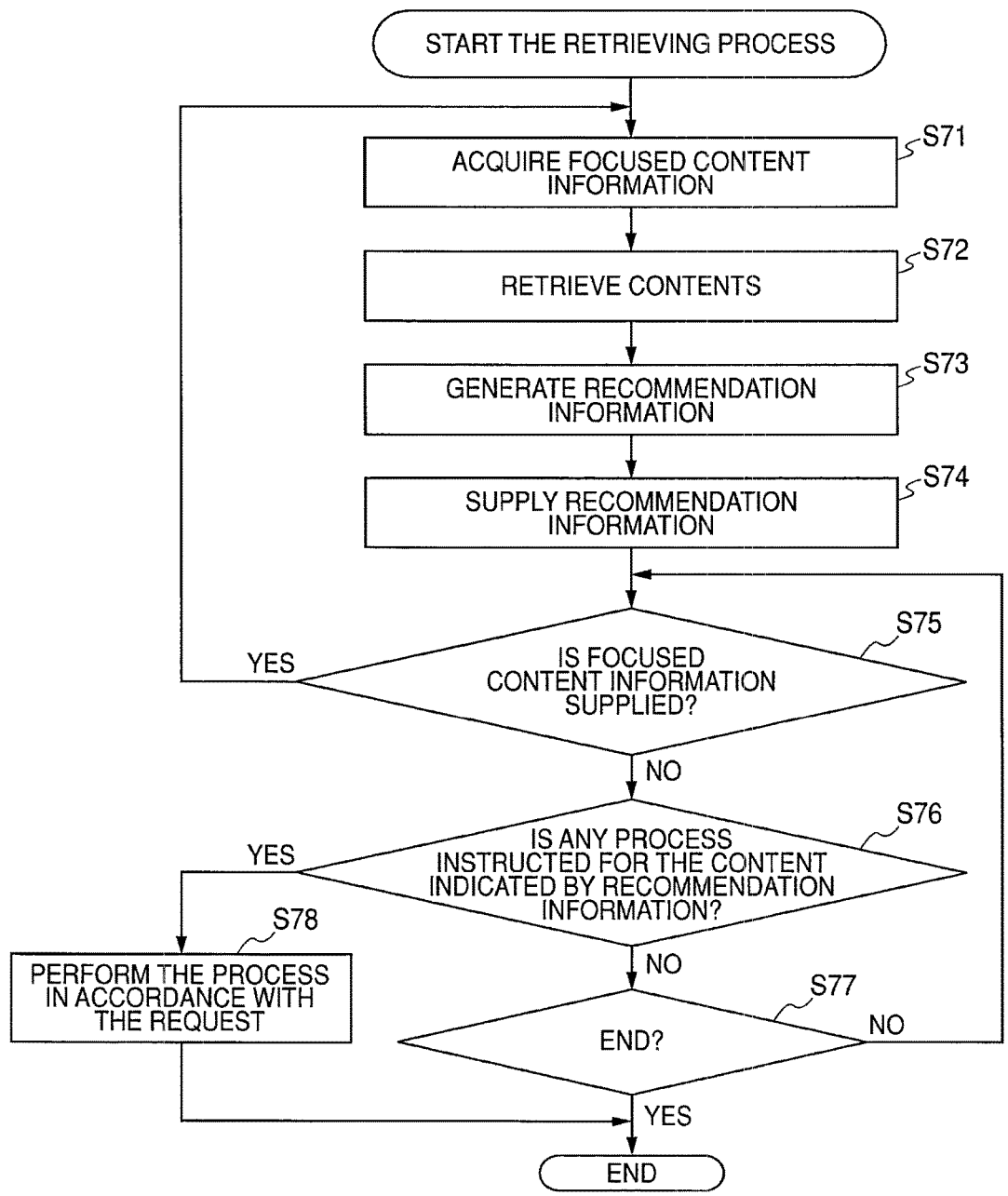
FIG. 10 shows a flow chart illustrative of a retrieving process.

In the information processing apparatus, the display control means may further control display of information relating to each of a plurality of contents on the display means (for example, a process in Step S41 shown in FIG. 9), and the acquiring means may acquire focused content information about a content indicated by a single selected item of the information in a plurality of items of the displayed information (for example, a process in Step S71 shown in FIG. 10).

An information processing method or a program according to an embodiment of the invention is an information processing method or a program that allows a computer to execute a process including the steps of: acquiring focused content information that is information relating to a predetermined content and includes at least any one of descriptions of the predetermined content having information displayed on a display means, a word related to the descriptions, a genre, a title, and cast of the predetermined content (for example, Step S71 shown in FIG. 10); using content information about the other content that includes at least any one of descriptions of the other content different from the predetermined content, a genre, a title, and cast of the other content and the acquired focused content information to retrieve a content having a high degree of relation to focused content information in the other contents by a retrieving means (for example, Step S72 shown in FIG. 10); and generating specification information that specifies the resulted content of retrieval based on the result of retrieval done by the retrieving means (for example, Step S73 shown in FIG. 10).

Hereinafter, embodiments to which the invention is adapted will be described with reference to the drawings.

Figure 1:
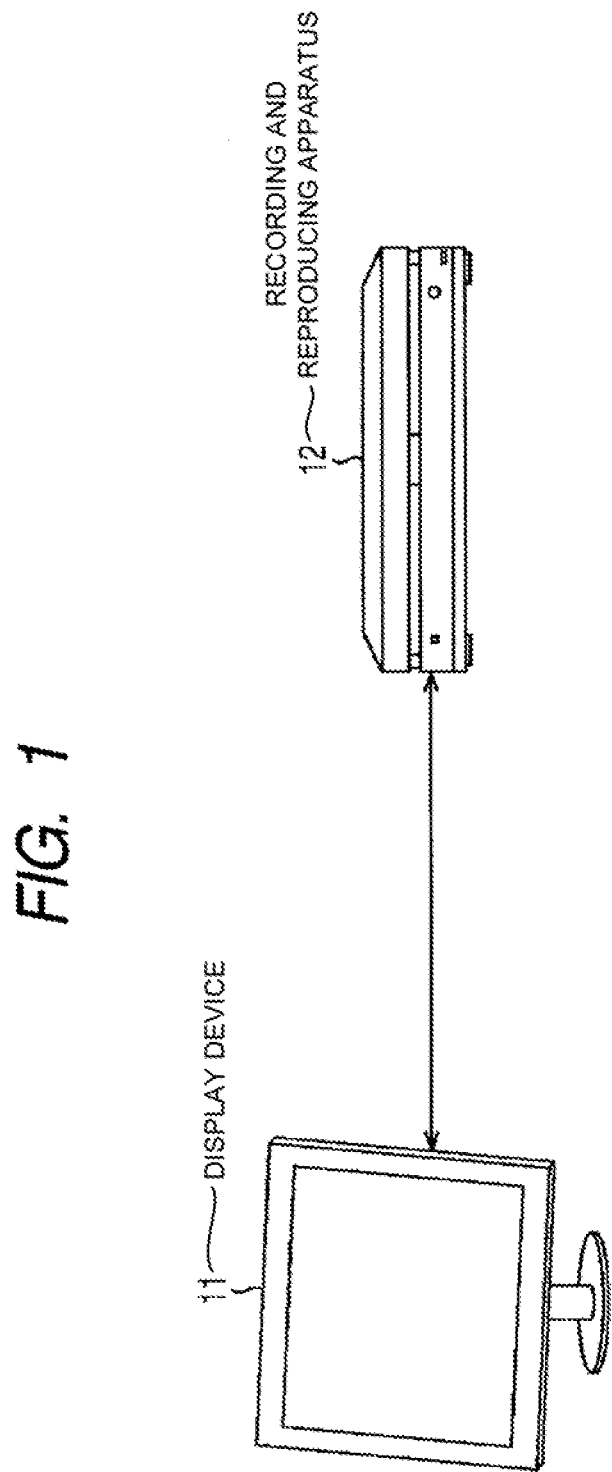
FIG. 1 shows a diagram depicting an exemplary configuration of an embodiment of a content display system to which an embodiment of the invention is adapted.

FIG. 1 shows a diagram depicting an exemplary configuration of an embodiment of a content display system to which the invention is adapted. This content display system is configured of a display device 11 and a recording and reproducing apparatus 12, in which the display device 11 is connected to the recording and reproducing apparatus 12 through a cable or the like.

The display device 11 is formed of a television set, for example, which displays a content or displays various screens such as a menu screen for settings and a program guide based on a control signal sent from a remote commander, not shown. Here, the term content is referred to as a broadcast program that is being broadcast on television, a broadcast program that has been broadcast on television and recorded, and various moving images such as moving images that are distributed from a content distribution apparatus such as a server via a communication network, not shown.

For example, the display device 11 receives and displays a broadcast program being broadcast on television as a content, or acquires and displays a broadcast program recorded as a content from the recording and reproducing apparatus 12 or moving images distributed via the communication network.

For example, the recording and reproducing apparatus 12 is formed of a hard disk recorder or a DVD (Digital Versatile Disc) recorder, which receives and records a broadcast program as a content based on control signals sent from the remote commander, not shown, or an instruction from the display device 11. In addition, the recording and reproducing apparatus 12 acquires a content from the content distribution apparatus via the communication network in accordance with an instruction from the display device 11 and supplies it to the display device 11, or supplies a recorded content to the display device 11.

A screen on which information relating to a content is displayed on the display device 11, the screen including an option screen on which information about the descriptions and cast of the content displayed right before is displayed, a program guide on which a broadcast schedule of contents is displayed, and a recording preselect screen for contents, and then on that screen, recommendation information that indicates the other contents related to the content specified by information on the screen is displayed. This recommendation information is information that indicates contents recommended for a user by the recording and reproducing apparatus 12 and is information for specifying the recommended contents.

Figure 2:
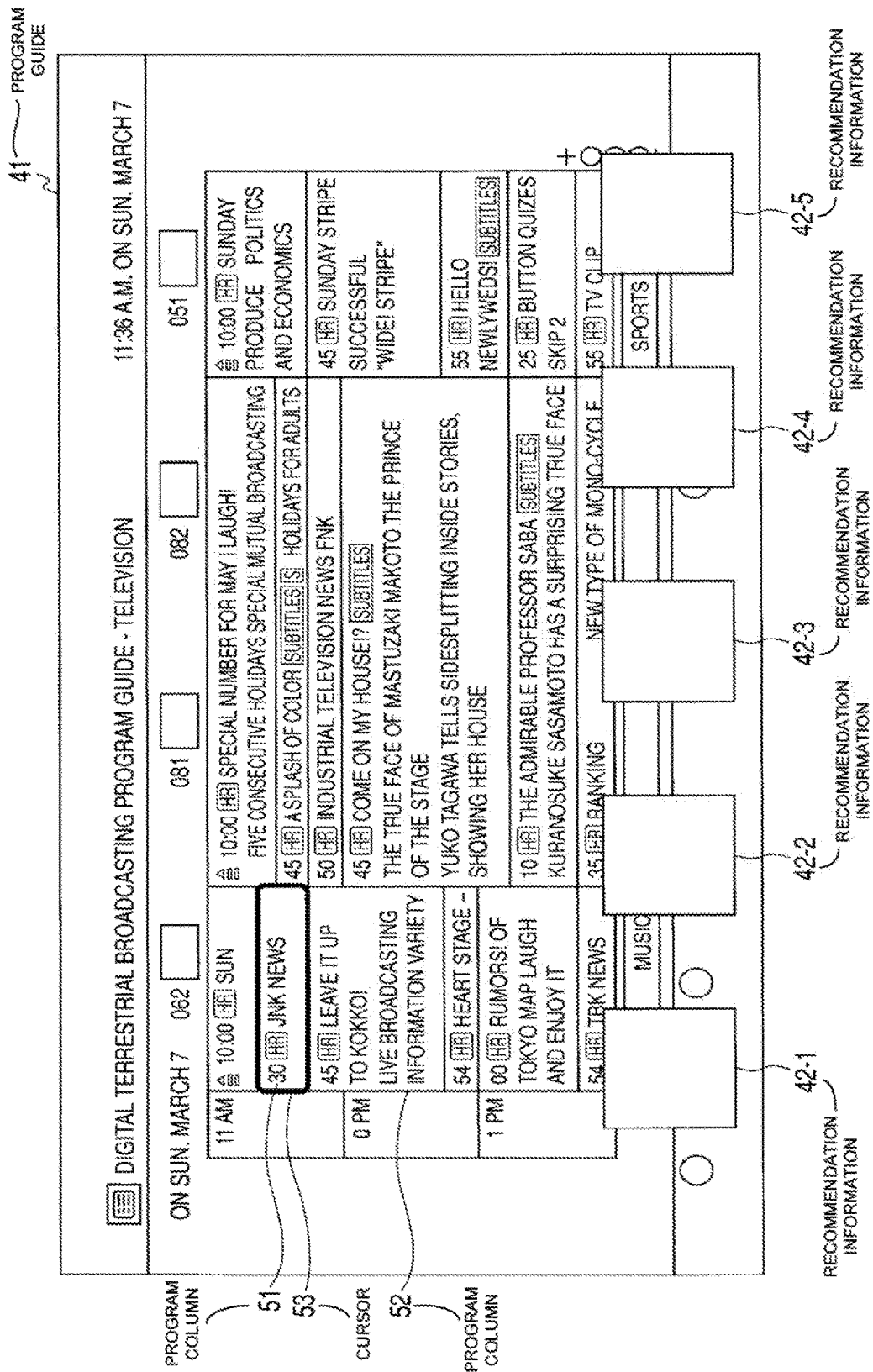
FIG. 2 shows a diagram depicting an exemplary display of a program guide.

For example, as shown in FIG. 2, a program guide 41 is displayed on the display device 11, and then recommendation information 42-1 to recommendation information 42-5 are displayed on the program guide 41.

In the drawing, the program guide 41 has the time instant in the vertical direction and has channels (broadcast stations) in the lateral direction, which is sectioned by a time at which a broadcast program as a content is broadcast and a program column specified by a broadcast station, in which in the individual program columns, broadcast program information is arranged such as information that indicates the title and the start time of the corresponding broadcast program. In FIG. 2, the program columns of broadcast programs are displayed that are broadcast from 11:00 a.m. to 1:59 p.m. on four channels "062", "081", "082", and "051".

For example, in a program column 51, broadcast program information for a broadcast program is arranged that has the title "JNK news" broadcast on Channel 062 at 11:30. In the drawing, in a program column 52 arranged just below the program column 51, a broadcast program information for a broadcast program that has a title "Leave it up to Kokko!" broadcast on Channel 062 at 11:45. In addition, in the program guide 41, a cursor 53 for selecting a program column is also displayed. In FIG. 2, the broadcast program information arranged in the program column 51 is selected by the cursor 53.

Moreover, in the drawing of the program guide 41, recommendation information 42-1 to recommendation information 42-5 are arranged in the lateral direction and displayed on the lower side. These items of recommendation information 42-1 to the recommendation information 42-5 are information that indicates a content having a high degree of relation with a broadcast program (content) specified by the broadcast program (content) selected by the cursor 53 on the program guide 41, that is, broadcast program information selected by the cursor 53. For example, broadcast program information is information for specifying a content such as the thumbnail image, title, descriptions, broadcast date and time, and channel of the content.

In FIG. 2, since the broadcast program (broadcast program information) of the title "JNK news" is selected by the cursor 53, information such as thumbnail images and titles indicating the contents related to news are displayed as recommendation information 42-1 to recommendation information 42-5, for example. Here, the content indicated by each item of recommendation information 42-1 to recommendation information 42-5 is a content before broadcast, a content taped and recorded in the recording and reproducing apparatus 12, and a content distributed by a content distribution apparatus, not shown. In addition, hereinafter, in the case in which it is unnecessary to particularly distinguish between recommendation information 42-1 to recommendation information 42-5, they are simply referred to as recommendation information 42.

In addition, when a user manipulates the remote commander to instruct the cursor 53 to move, the display device 11 moves the cursor 53 in accordance with user manipulation as well as newly displays recommendation information that indicates contents related to the broadcast program newly selected by the moved cursor 53. More specifically, the recommendation information 42 is updated to information that indicates the contents related to the broadcast program newly selected.

Furthermore, when the user manipulates the remote commander to move the cursor 53 to recommendation information 42 and instructs a process such as a process for display (watching), a process for a preselect for watching, a process for recording, a process for a preselect for recording of a content indicated by the recommendation information 42, the process instructed by the user is performed by the display device 11.

As described above, since the broadcast program selected by the cursor 53, that is, recommendation information 42 for the contents related to the content on which the user focuses attention is displayed on the program guide 41, the user sees the recommendation information 42 to find the contents of his/her favorites with no special manipulations.

In other words, generally, since the user moves the cursor 53 in such a way that the broadcast program of his/her interest is selected, it is highly likely that the broadcast program indicated by the broadcast program information selected by the cursor 53 is a broadcast program in which the user expresses his/her interest. Therefore, it is also estimated that the contents related to the broadcast program selected by the cursor 53 are the contents in which a user is interested. Then, as recommendation information 42, recommendation information 42 that indicates the contents having a high degree of relation to the broadcast program selected by the cursor 53 is displayed, whereby information relating to the contents in which the user may express his/her interest can be presented for the user. Therefore, the user sees recommendation information 42 to readily find the contents of his/her favorites.

Figure 3:
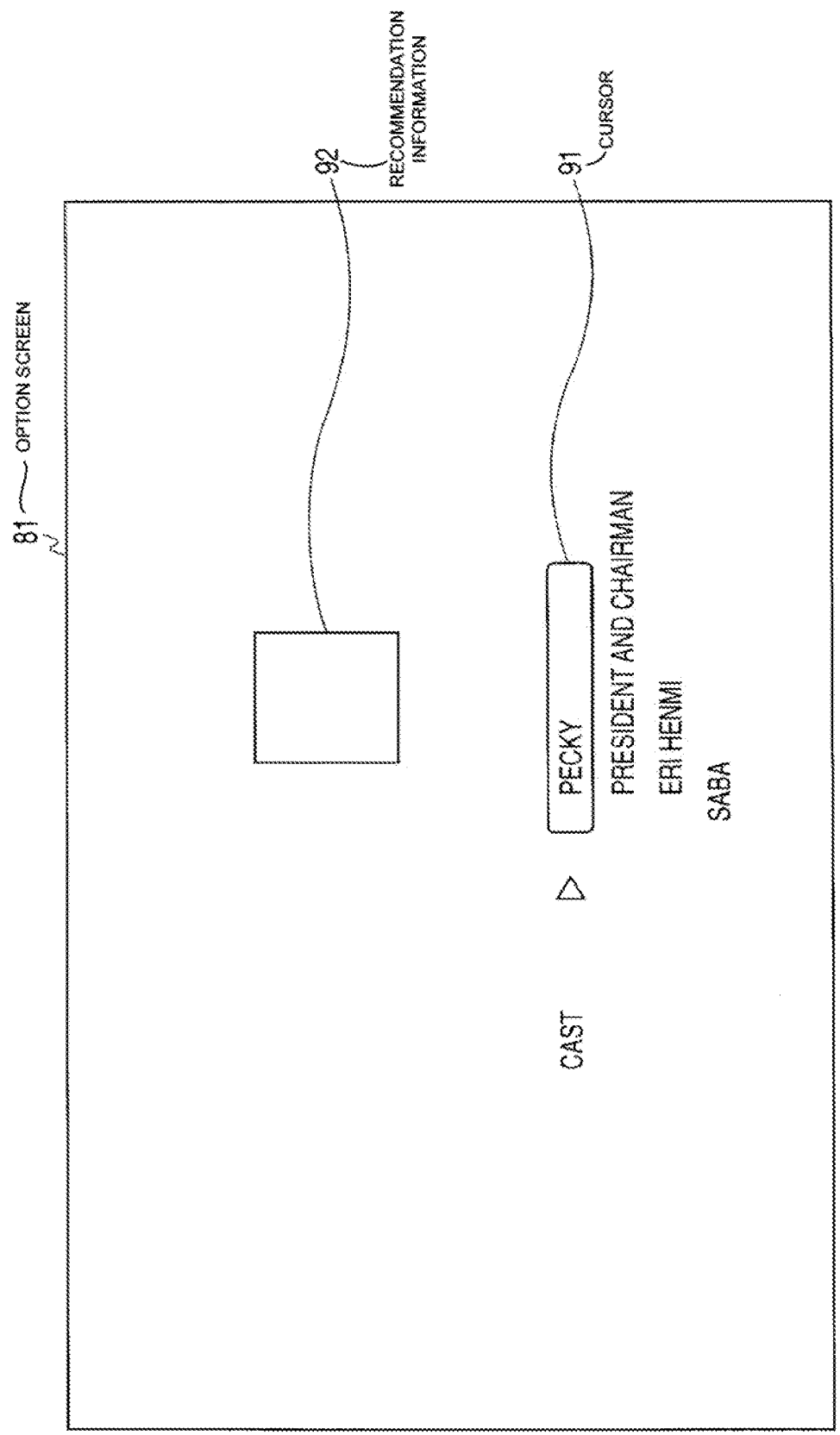
FIG. 3 shows a diagram depicting an exemplary display of an option screen.

In addition, when the user manipulates the remote commander to instruct showing the option screen while being watching a content displayed on the display device 11, in accordance with user manipulation, the display device 11 displays an option screen shown in FIG. 3, for example.

On an option screen 81, information that indicates the cast of the content displayed on the display device 11 as well as a cursor 91 that selects any one of items of information that indicates the cast are displayed. In the example shown in FIG. 3, for information that indicates the cast, text indicating the cast "Pecky", "President and Chairman", "Eri Henmi" and "Saba" is displayed, and the cursor 91 selects information that indicates the cast "Pecky".

In addition, on the upper side of the option screen 81, recommendation information 92 is displayed. This recommendation information 92 is information that indicates contents related to information that indicates the cast "Pecky" selected by the cursor 91, and the recommendation information 92 is information for specifying a content such as the thumbnail image, title, descriptions, broadcast date and time, and channel of the content. Therefore, for example, the contents indicated by the recommendation information 92 are the contents on which "Pecky" appears.

Then, when the user manipulates the remote commander to instruct the cursor 91 to move to information that indicates the cast "President and Chairman", in accordance with user manipulation, the display device 11 moves the cursor 91 as well as newly displays recommendation information that indicates the contents related to information that indicates the cast "President and Chairman" newly selected by the cursor 91.

In addition, when the user manipulates the remote commander to move the cursor 91 to recommendation information 92, and instructs a process such as a process for display, a process for a preselect for watching, a process for recording, and a process for a preselect for recording of the contents indicated by the recommendation information 92, the process instructed by the user is performed by the display device 11.

As described above, in the contents displayed on the display device 11, that is, information relating to the contents on which the user focuses attention, recommendation information 92 for the contents related to information selected by the cursor 91 is displayed on the option screen 81. Thus, the user sees the recommendation information 92 to find the contents of his/her favorites with no special manipulations.

In other words, since the information selected by the cursor 91 is information in which the user is interested, information that indicates the contents having a high degree of relation to information selected by the cursor 91 is displayed as the recommendation information 92, whereby information relating to the contents in which the user may express interest can be presented for the user.

In addition, in FIG. 3, for information displayed on the option screen 81, information that indicates the cast of the displayed content is taken and described as an example. However, in addition to this, any items of information may be possible as long as the information is information relating to the contents that the user has watched, such as the explanation of the descriptions of the content. Therefore, for example, suppose that text that explains the descriptions of the content having been displayed on the display device 11 is displayed on the option screen and a predetermined word included in the text is selected by the cursor. Then, information that indicates the contents related to the word selected by the cursor is displayed as recommendation information.

In addition, in the case in which as the option screen, such a screen is displayed that makes the settings for the subtitles of the contents, recommendation information that indicates the contents having a high degree of relation to the word included in the subtitles of the selected content may be displayed.

Figure 4:
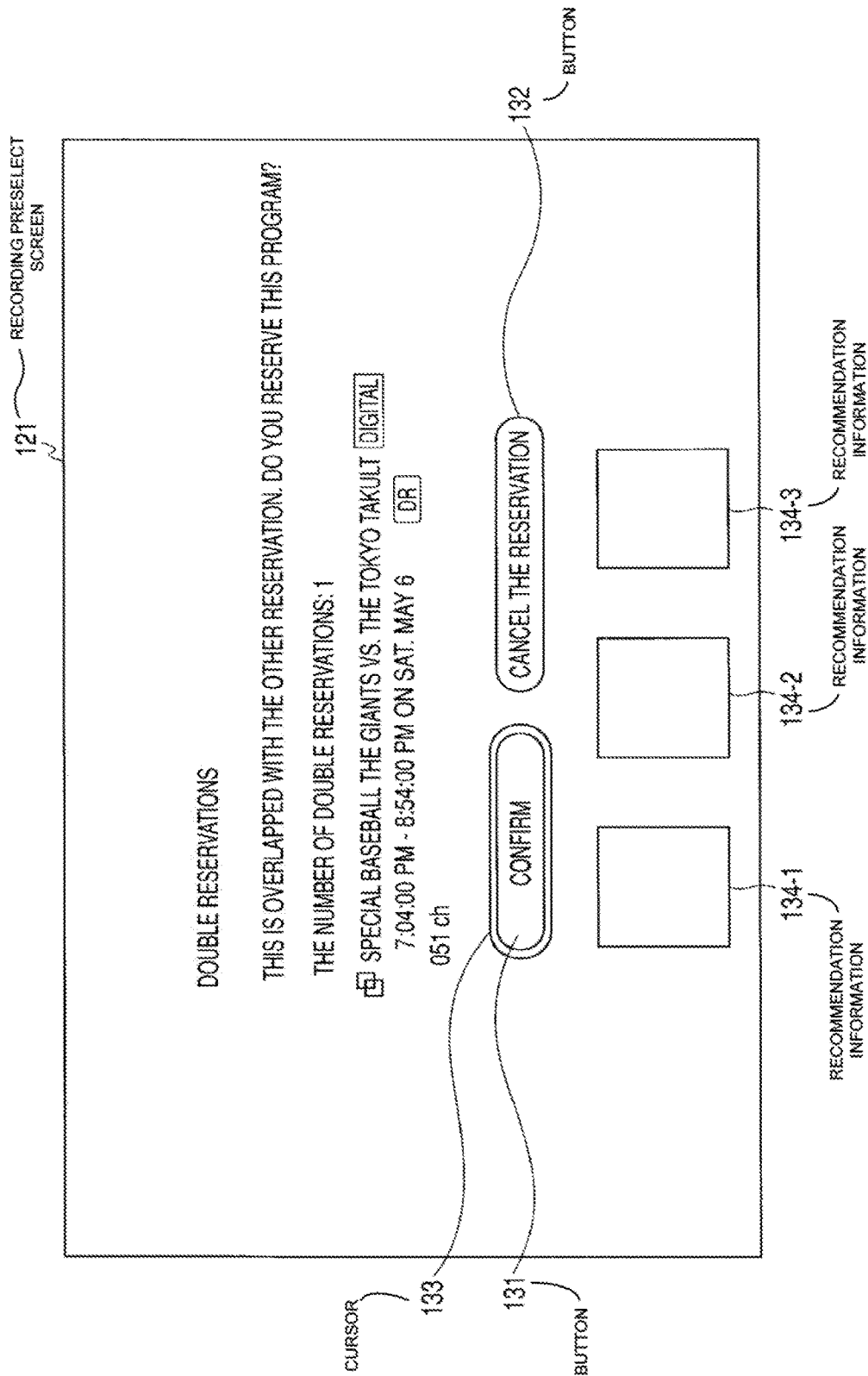
FIG. 4 shows a diagram depicting an exemplary display of a recording preselect screen.

Moreover, when the user manipulates the remote commander to instruct a preselect for recording a predetermined content, in accordance with user manipulation, the display device 11 displays a recording preselect screen shown in FIG. 4, for example.

On a recording preselect screen 121 shown in FIG. 4, for information that specifies the content instructed to be a preselect for recording by the user, the text "Special Baseball the Giants vs. the Tokyo Takult" indicating the title of the content, the text "7:04:00 PM-8:54:00 PM on Sat. May 6" indicating the broadcast date and time of the content, and the text "051 ch." indicating the channel are displayed.

In addition, on the recording preselect screen 121, a button 131 that is manipulated when a preselect for recording of the content is confirmed, a button 132 that is manipulated when a preselect for recording is cancelled, and a cursor 133 that selects the button 131 or the button 132 are displayed. The user manipulates the remote commander to move the cursor 133 for selecting and manipulating the button 131 or the button 132, whereby the user can make a preselect for the content or cancel this preselect.

Moreover, on the lower side of the recording preselect screen 121, the contents that are targets for a preselect for recording, that is, recommendation information 134-1 to the recommendation information 134-3 that indicate the other contents related to a content specified by the information that specifies the contents such as the title and the broadcast date and time are displayed and arranged on the recording preselect screen 121 in the lateral direction.

These items of recommendation information 134-1 to the recommendation information 134-3 are information that indicates the contents related to the contents that are targets for a preselect for recording, and are information for specifying a content such as the thumbnail image, title, descriptions, broadcast date and time, and channel of the content. Therefore, for example, the contents indicated by the recommendation information 134-1 to the recommendation information 134-3 are sports, particularly to the contents related to baseball. In addition, hereinafter, in the case in which it is unnecessary to particularly distinguish between the recommendation information 134-1 to the recommendation information 134-3, they are simply referred to as recommendation information 134.

In addition, when the user manipulates the remote commander to move the cursor 133 to the recommendation information 134 and instructs a process such as a process for display, a process for a preselect for watching, a process for recording, and a process for a preselect for recording of the content indicated by the recommendation information 134, the process instructed by the user is performed by the display device 11.

As described above, since the contents that are instructed to be a preselect for recording, that is, the recommendation information 134 for the contents related to the content on which the user focuses attention are displayed on the recording preselect screen 121, the user sees the recommendation information 134 to readily find the contents of his/her favorites with no special manipulations.

In other words, since the contents that are targets for a preselect for recording are the contents in which the user is interested, information that indicates the contents having a high degree of relation to the content on which the user focuses attention is displayed as the recommendation information 134, whereby information relating to the contents in which the user may express interest can be presented for the user.

In addition, in FIG. 4, for the screen on which information relating to the contents is displayed, the recording preselect screen is taken and described as an example. However, in addition to this, any screens may be possible as long as the screens are a screen on which information relating to the content on which the user focuses attention is displayed, such as a detail screen on which the detailed descriptions and cast of the contents are displayed, a dubbing screen by which dubbing of the recorded content is instructed onto a predetermined recording medium, a screen for a preselect for watching by which a preselect for watching is made, and a content list screen for which contents distributed by the content distribution apparatus.

Next, FIG. 5 shows a block diagram depicting an exemplary configuration of the display device 11 shown in FIG. 1.

The display device 11 is configured of a content acquiring part 161, a content information holding part 162, an input accepting part 163, a control part 164, a display control part 165, a display part 166, and a communicating part 167.

For example, the content acquiring part 161 is formed of a tuner, which receives a content sent from a broadcast station, not shown, and content information sent together with the content. Here, the content information is an EPG (Electronic Program Guide), for example, and the content information includes information relating to the content being broadcast such as the title of the content, the broadcast date and time, the broadcast station name, the genre to which the content belongs, the descriptions of the content, and the cast. The content acquiring part 161 receives and acquires a content, supplies the content to the display control part 165 as well as supplies the acquired content information to the content information holding part 162.

The content information holding part 162 maintains the content information supplied from the content acquiring part 161, and supplies the maintained content information to the control part 164 as necessary. The input accepting part 163 receives a control signal sent from the remote commander, not shown. Then, the input accepting part 163 subjects the received control signal to photoelectric conversion, and supplies the control signal that is the resulted electric signal to the control part 164.

Based on the control signal supplied from the input accepting part 163, the control part 164 controls the overall display device 11. Based on the content information supplied from the content information holding part 162, the control part 164 generates various screens such as a program guide, and supplies the screen such as the generated program guide to the display control part 165. In addition, based on the control signal from the input accepting part 163, the control part 164 supplies a request to perform a predetermined process to the recording and reproducing apparatus 12 through the communicating part 167, or performs a predetermined process in accordance with the request supplied from the recording and reproducing apparatus 12 through the communicating part 167.

Moreover, when a content is supplied from the recording and reproducing apparatus 12 through the communicating part 167, the control part 164 provides the supplied content to the display control part 165. In addition, more specifically, in the case in which a content is supplied from the recording and reproducing apparatus 12, the content information about the content is also supplied together with the content. Thus, the control part 164 supplies the supplied content information to the content information holding part 162 and control the part 162 to maintain the information.

The display control part 165 controls the display of images on the display part 166. In other words, the display control part 165 supplies and displays the content provided from the content acquiring part 161 on the display part 166, or supplies and displays the program guide, various screens, and the content provided from the control part 164 on the display part 166. For example, the display part 166 is formed of a liquid crystal display, which displays thereon the content, the program guide, and various screens supplied from the display control part 165.

In addition, more specifically, in the case in which moving image data as well as audio data to reproduce sounds are supplied as a content to the display control part 165, the display control part 165 provides the supplied audio data to a speaker, not shown, and reproduces sounds therefrom.

The communicating part 167 sends and receives a predetermined item of data and signals with the recording and reproducing apparatus 12. For example, the communicating part 167 supplies the content provided from the recording and reproducing apparatus 12 and various signals to the control part 164, and supplies various signals provided from the control part 164 to the recording and reproducing apparatus 12.

FIG. 6 shows a block diagram depicting an exemplary configuration of the recording and reproducing apparatus 12 shown in FIG. 1.

The recording and reproducing apparatus 12 is configured of a content acquiring part 191, a recording part 192, a retrieving part 193, an input accepting part 194, a control part 195, a communicating part 196, and a communicating part 197.

For example, the content acquiring part 191 is formed of a tuner, which acquires a content, and content information about the content. For example, the content acquiring part 191 receives a content sent from the broadcast station, not shown, and content information sent together with the content. In addition, the content acquiring part 191 acquires a content, and content information about the content from the content distribution apparatus through the communicating part 196 and the communication network, not shown. The content acquiring part 191 supplies the acquired content information to the recording part 192.

In addition, the content acquiring part 191 has a recording control part 211. The recording control part 211 controls the recording of a content. In other words, when the content acquiring part 191 acquires a content instructed for recording by the control part 195, or a content preselected for recording, the recording control part 211 supplies and records the acquired content, and content information about the content in the recording part 192.

For example, the recording part 192 is formed of a hard disk, which records thereon a content and content information supplied from the content acquiring part 191 and various items of data and information supplied from the retrieving part 193 such as appearance frequency information. Here, appearance frequency information is the frequency of appearance of words included in content information about the content, that is, information that indicates the number of included words for a single content. The recording part 192 records a single item of information about the frequency of appearance for every item of recorded content information.

In accordance with the instruction from the control part 195, the retrieving part 193 retrieves the other contents related to the contents on which the user focuses attention. The retrieving part 193 has an appearance frequency information generating part 212 and a recommendation information generating part 213.

The appearance frequency information generating part 212 uses content information supplied from the content acquiring part 191 to generate appearance frequency information about the content information, and supplies and records the generated appearance frequency information in the recording part 192.

In addition, when the retrieving part 193 is instructed to retrieve the other contents related to the content on which the user focuses attention by the control part 195, the retrieving part 193 uses focused content information that is information relating to the focused contents supplied from the control part 195 and appearance frequency information recorded in the recording part 192 to retrieve the contents having a high degree of relation to the focused content information.

More specifically, the appearance frequency information generating part 212 of the retrieving part 193 generates appearance frequency information about focused content information supplied from the control part 195 as necessary, and the retrieving part 193 uses the generated appearance frequency information and the appearance frequency information recorded in the recording part 192 to retrieve the contents as necessary.

Based on the result of the contents retrieved by the retrieving part 193, the recommendation information generating part 213 of the retrieving part 193 generates recommendation information, and supplies the generated recommendation information to the control part 195. This recommendation information is supplied from the control part 195 to the display device 11 through the communicating part 197, and displayed on the display device 11.

The input accepting part 194 receives a control signal sent from the remote commander, not shown. Then, the input accepting part 194 subjects the received control signal to photoelectric conversion, and supplies the control signal that is the resulted electric signal to the control part 195.

Based on the control signal supplied from the input accepting part 194, the control part 195 controls the overall recording and reproducing apparatus 12. In addition, in accordance with the request from the display device 11, the control part 195 supplies the focused content information provided from the display device 11 through the communicating part 197 to the retrieving part 193, and instructs the retrieving part 193 to retrieve the contents related to the focused content information.

Moreover, the control part 195 supplies various items of information such as recommendation information provided from the retrieving part 193 to the display device 11 through the communicating part 197, or performs various processes in accordance with the request from the display device 11. For example, the control part 195 acquires the contents requested by the display device 11 from the content acquiring part 191 or the recording part 192, and supplies the acquired contents to the display device 11 through the communicating part 197. In addition, for example, the control part 195 instructs the recording control part 211 of the content acquiring part 191 to record the contents in accordance with the control signal from the input accepting part 194 or in accordance with the request from the display device 11.

The communicating part 196 communicates with the content distribution apparatus via the communication network, not shown, and receives and sends various items of information and data such as content information and contents. For example, the communicating part 196 supplies contents and content information received from the content distribution apparatus to the content acquiring part 191, or sends various requests supplied from the control part 195 to the content distribution apparatus.

The communicating part 197 sends and receives predetermined items of data and information with the display device 11. For example, the communicating part 197 supplies various items of information and requests provided from the display device 11 to the control part 195, or supplies contents, various requests and information provided from the control part 195 to the display device 11.

In accordance with a predetermined cycle or the instruction from the control part 195, the content acquiring part 191 acquires content information. When it is the timing at which the content acquiring part 191 acquires content information, the recording and reproducing apparatus 12 starts an appearance frequency information generating process that is a process in which content information is acquired to generate appearance frequency information.

Figure 7:
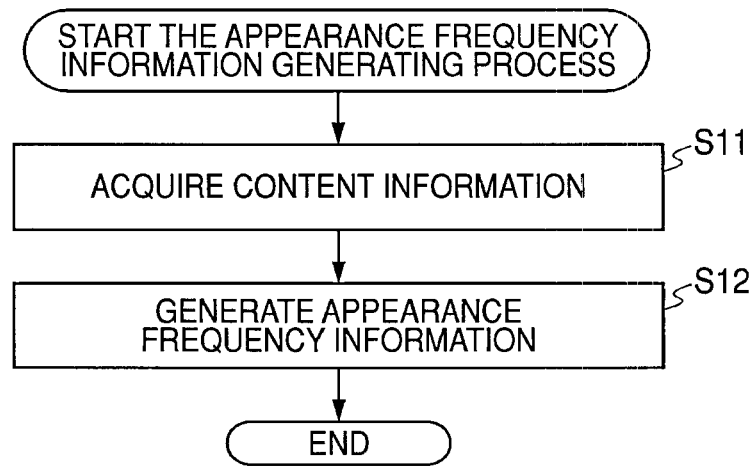
FIG. 7 shows a flow chart illustrative of an appearance frequency information generating process.

Hereinafter, the appearance frequency information generating process performed by the recording and reproducing apparatus 12 will be described with reference to a flow chart shown in FIG. 7.

In Step S11, the content acquiring part 191 acquires content information. For example, the content acquiring part 191 receives content information sent from the broadcast station, not shown, together with a content, whereby it acquires content information such as an EPG. In addition, for example, when the control part 195 requests the content distribution apparatus, not shown, to send content information, the content distribution apparatus sends content information such as an ECG (Electric Content Guide) to the recording and reproducing apparatus 12. Thus, the communicating part 196 receives the content information sent from the content distribution apparatus, and the content acquiring part 191 acquires the content information received by the communicating part 196.

The content acquiring part 191 acquires the content information, and then supplies and records the acquired content information in the recording part 192 as well as supplies the content information to the retrieving part 193.

In Step S12, based on the content information supplied from the content acquiring part 191 to the retrieving part 193, the appearance frequency information generating part 212 generates appearance frequency information for every item of content information. The appearance frequency information generating part 212 supplies and records the generated appearance frequency information in the recording part 192, and the appearance frequency information generating process is ended.

For example, the appearance frequency information generating part 212 performs morphological analysis as the title and detail of the content included in content information are targets as shown in FIG. 8. In FIG. 8, the left side shows the title, the genre, and the detail included in content information, and in the drawing, the right side shows appearance frequency information generated based on the content information.

The content information includes the text "Saba's golf" indicating the title of the content, and the text "variety" indicating the genre to which the content belongs. In addition, as information that indicates the detail included in the content information, such information is contained that indicates the explanation of the descriptions of the content and the cast. In other words, information that indicates the detail of the content includes the text "Saba and Takeo play golf in Hodogaya . . . " that describes the descriptions of the content and the text indicating the cast "Saba, and Takeo".

The appearance frequency information generating part 212 applies morphological analysis to the text strings of the title "Saba's golf", the explanation of the descriptions "Saba and Takeo play golf in Hodogaya . . . " and the cast "Saba and Takeo", and extracts the resulted words, that is, words whose part of speech is a noun. Then, the appearance frequency information generating part 212 generates the frequency of appearance of the extracted individual words, that is, appearance frequency information that indicates the number of words included in the text strings targeted for morphological analysis.

Thus, for example, the appearance frequency information shown on the right side in FIG. 8 is generated. The appearance frequency information includes the words extracted through morphological analysis and information that indicates the frequency of appearance of the words. In other words, the appearance frequency information includes the extracted words "Saba", "Takeo", and "golf", and includes the following; the frequency of appearance of the word "Saba" is "3", the frequency of appearance of the word "Takeo" is "2", and the frequency of appearance of the word "golf" is "2". Here, since the text strings indicating the title of content information, the explanation of the descriptions of the content, and the cast include the word "Saba" one each, the frequency of appearance of the word "Saba" is "3".

As described above, since appearance frequency information includes a word contained in content information and information that indicates the frequency of appearance of that word, appearance frequency information is used to simply and reliably detect the contents related to the content indicated by content information. In addition, the appearance frequency information may include information that indicates the genre contained in content information. In this case, for example, the appearance frequency information shown on the right side in FIG. 8 includes information that indicates the genre contained in content information "variety" on the left side.

In this manner, the recording and reproducing apparatus 12 acquires content information to generate appearance frequency information for every content information acquired. As described above, appearance frequency information is generated in advance for every item of content information, that is, for every content, whereby the generated appearance frequency information is used to more quickly retrieve contents.

In addition, when the user manipulates the remote commander to instruct the display device 11 to display the screen on which information relating to contents is displayed such as the program guide 41, the option screen 81, and the recording preselect screen 121 shown in FIGS. 2 to 4, the display device 11 displays the screen instructed for display as well as starts a recommendation information display process that is a process in which recommendation information relating to the content on which the user focuses attention is displayed. Hereinafter, the recommendation information display process performed by the display device 11 will be described with reference to a flow chart shown in FIG. 9.

In Step S41, the display part 166 displays a screen corresponding to user manipulation. In other words, the input accepting part 163 receives a control signal sent from the remote commander in accordance with user manipulation for photoelectric conversion, and supplies the control signal that is the resulted electric signal to the control part 164. The control part 164 instructs the display control part 165 to display a screen in accordance with the control signal supplied from the input accepting part 163, and the display control part 165 displays the screen on the display part 166 in accordance with the instruction by the control part 164.

For example, in the case in which the user instructs the display of the program guide, the control part 164 acquires content information from the content information holding part 162 in accordance with the control signal from the input accepting part 163, and uses the content information to generate a program guide, more specifically, image data for display a program guide. Then, the control part 164 supplies the generated program guide to the display control part 165, and instructs the display of the program guide.

In addition, for example, in the case in which the user instructs the display of an option screen, the control part 164 acquires content information from the content information holding part 162 in accordance with the control signal from the input accepting part 163, and uses the acquired content information to generate the option screen.

Moreover, for example, in the case in which the user specifies a predetermined content and instructs a preselect for recording of the content, the control part 164 acquires content information from the content information holding part 162 in accordance with the control signal from the input accepting part 163, and uses the acquired content information to generate a recording preselect screen that confirms a preselect for recording of the content specified by the user.

In this manner, the control part 164 supplies the generated screen from the control part 164 to the display control part 165, and then the display control part 165 provides the screen supplied from the control part 164 to the display part 166 to display it thereon.

In Step S42, the control part 164 generates focused content information about a focused content that is the content on which the user focuses attention. For example, in the case in which the program guide 41 shown in FIG. 2 is displayed on the display part 166, the control part 164 considers the broadcast program selected by the cursor 53 to be the focused content, and acquires focused content information about the content from the content information holding part 162 to generate focused content information that includes the title of the content, the broadcast date and time, the broadcast station (channel), the genre, and the detail of the content contained in the acquired content information. Here, the detail of the content included in focused content information contains the explanation of the descriptions of the content and information that indicates the cast.

In addition, for example, in the case in which the option screen 81 shown in FIG. 3 is displayed on the display part 166, the control part 164 considers the content that has been displayed right before the option screen 81 is displayed to be the focused content, and acquires focused content information about the content from the content information holding part 162 to generate focused content information that includes the title of the content, the broadcast date and time, the broadcast station, the genre, and the detail of the content contained in the acquired content information and that also includes information that indicates the cast "Pecky" selected by the cursor 91.

Moreover, for example, in the case in which the recording preselect screen 121 shown in FIG. 4 is displayed on the display part 166, the control part 164 considers the content that is a target for a preselect for recording is the focused content on the recording preselect screen 121, and acquires focused content information about the content from the content information holding part 162 to generate focused content information that includes the title of the content, the broadcast date and time, the broadcast station, the genre, and the detail of the content contained in the acquired content information.

The control part 164 generates focused content information, and then supplies the generated focused content information to the recording and reproducing apparatus 12 through the communicating part 167. Then, recommendation information about the contents having a high degree of relation to the focused content information is supplied from the recording and reproducing apparatus 12 to the display device 11.

In Step S43, the communicating part 167 acquires the recommendation information supplied from the recording and reproducing apparatus 12, and provides the acquired recommendation information to the display control part 165 through the control part 164.

In Step S44, the display control part 165 supplies the recommendation information provided from the control part 164 to the display part 166, and the display part 166 displays the recommendation information supplied from the display control part 165 thereon. Therefore, the recommendation information is displayed on the screen displayed on the display part 166.

In Step S45, the control part 164 determines whether the cursor displayed on the display part 166 is instructed to move to the information relating to the focused content based on the control signal from the input accepting part 163.

For example, in the case in which the program guide 41 shown in FIG. 2 is displayed on the display part 166, broadcast program information that is information relating to the contents is arranged on each of the program columns on the program guide 41, and the user moves the cursor 53 to select these items of broadcast program information (contents). For example, in the state in which the broadcast program information arranged on the program column 51 is selected by the cursor 53 as information relating to the content, when the user manipulates the remote commander to instruct the cursor 53 to move from the program column 51 to the program column 52, the control part 164 determines that the cursor is instructed to move to the information relating to the focused content.

In other words, in the case in which the cursor 53 is instructed to move to another program column, it is determined that a move is instructed. In addition, since the contents indicated by the recommendation information 42 are not considered to be the focused content, in the case in which the cursor 53 is instructed to move to the recommendation information 42, it is determined that no move is instructed.

In addition, for example, on the recording preselect screen 121 shown in FIG. 4, since the cursor 133 may not select any items of information relating to the focused content, it is determined that no move is instructed. In other words, on the recording preselect screen 121, since the cursor 133 can only select the button 131 that confirms a preselect for recording, the button 132 that cancels a preselect, or the recommendation information 134, in the case in which the recording preselect screen 121 is displayed on the display part 166, it is always determined that no move is instructed in Step S45.

In Step S45, if it is determined that the cursor is instructed to move, the process returns to Step S41, and the process steps described above are repeated. In other words, the cursor is moved to display a new screen on the display part 166, a new item of focused content information is generated for the information relating to the focused content newly selected by the cursor.

In contrast to this, in Step S45, if it is determined that the cursor is not instructed to move, the process goes to Step S46. The control part 164 determines whether any process is instructed for the content indicated by recommendation information based on the control signal from the input accepting part 163.

For example, in the state in which the program guide 41 shown in FIG. 2 is displayed on the display part 166, in the case in which the user manipulates the remote commander to move the cursor 53 to the recommendation information 42, and instructs a process such as a process for display (watching), a process for a preselect for watching, a process for recording, and a process for a preselect for recording of a content indicated by the recommendation information 42, it is determined that a process is instructed for the content.

In Step S46, if it is determined that no process is instructed for the content, the process goes to Step S47. The control part 164 determines whether the recommendation information display process is ended based on the control signal from the input accepting part 163.

For example, it is determined that the recommendation information display process is ended in the following cases: in the case in which the user manipulates the remote commander to instruct the end of displaying the program guide 41 in the state in which the program guide 41 shown in FIG. 2 is displayed on the display part 166, in the case in which it is instructed to end the display of the option screen 81 and to return to the display of the content displayed just before in the state in which the option screen 81 shown in FIG. 3 is displayed on the display part 166, and in the case in which the button 131 is manipulated to make a preselect for recording in the state in which the recording preselect screen 121 shown in FIG. 4 is displayed on the display part 166.

In Step S47, if it is determined that the process is not ended, the process returns to Step S45, and the process steps described above are repeated.

On the other hand, in Step S47, if it is determined that the process is ended, the control part 164 performs the process in accordance with the manipulation of the remote commander done by the user as well as it supplies a signal telling that the process is ended to the recording and reproducing apparatus 12 through the communicating part 167, and then the recommendation information display process is ended.

In addition, in Step S46, if it is determined that a process is instructed for the content, the process goes to Step S48, and the display device 11 performs the process in accordance with the user manipulation. In other words, based on the recommendation information selected by the cursor and the control signal from the input accepting part 163, the control part 164 controls the individual blocks of the display device 11 to perform the process instructed by the user, and supplies a signal telling that the process is ended to the recording and reproducing apparatus 12 through the communicating part 167. Then the recommendation information display process is ended.

For example, in the case in which the user instructs the display of the content indicated by the recommendation information and the content is a content being broadcast, based on the recommendation information selected by the cursor, the control part 164 instructs the display control part 165 to display the content instructed for display, that is, the content specified by the recommendation information. In accordance with the instruction by the control part 164, the display control part 165 acquires the instructed content from the content acquiring part 161, and supplies and displays the acquired content on the display part 166.

In addition, for example, in the case in which the user instructs the display of the content indicated by the recommendation information and the content is a content taped and recorded in the recording and reproducing apparatus 12, based on the recommendation information selected by the cursor, the control part 164 instructs the recording and reproducing apparatus 12 to reproduce the content specified by the recommendation information and instructed by the user. In other words, the control part 164 supplies a request to supply the content to the recording and reproducing apparatus 12 through the communicating part 167. Then, the communicating part 167 is supplied with the requested content from the recording and reproducing apparatus 12. Thus, the recording and reproducing apparatus 12 supplies the content to the communicating part 167, the control part 164 acquires the content from the communicating part 167 and supplies it to the display control part 165, and the display control part 165 provides and displays the content supplied from the control part 164 on the display part 166.

Moreover, for example, in the case in which the user instructs a preselect for recording of the content, the control part 164 instructs the recording and reproducing apparatus 12 to reserve the content instructed by the user, that is, to make a preselect for recording of the content specified by the recommendation information. In other words, the control part 164 supplies a request to make a preselect for recording to the recording and reproducing apparatus 12 through the communicating part 167.

In addition, in the case in which the user instructs a preselect for recording of the content indicated by the recommendation information, this scheme may be possible in which the control part 164 instructs the display control part 165 to display the recording preselect screen, and then the user sees the displayed recording preselect screen to confirm the preselect for recording of the content. Moreover, this scheme may be possible in which after the instructed preselect for recording of the content is completed, a screen having been displayed previously such as a program guide or an option screen is again displayed.

In addition, for example, in the case in which the user instructs a purchase of a chargeable content distributed through the content distribution apparatus, the control part 164 instructs the recording and reproducing apparatus 12 to purchase the content instructed by the user, that is, the content specified by the recommendation information. Then, the recording and reproducing apparatus 12 supplies the purchased content. Thus, the control part 164 acquires the content from the recording and reproducing apparatus 12 through the communicating part 167, and supplies the acquired content to the display part 166 through the display control part 165 for displaying it thereon.

In addition, in this case, since the display device 11 is supplied with a purchase screen that purchases a content from the recording and reproducing apparatus 12 as necessary, the display control part 165 displays the purchase screen supplied from the recording and reproducing apparatus 12 through the control part 164 and the communicating part 167 on the display part 166, and the control part 164 performs the process necessary to purchase the content in accordance with the control signal from the input accepting part 163.

In this manner, the display device 11 is instructed to display the screen on which information relating to the content is displayed, the display device 11 displays the instructed screen as well as acquires recommendation information relating to the content on which the user focuses attention from the recording and reproducing apparatus 12 and displays it thereon.

As described above, the recommendation information relating to the content on which the user focuses attention is displayed, whereby only information that indicates the contents related to the content in which the user is interested can be presented to the user. In other words, recommendation information that indicates the contents of user's favorites or contents which may attract user's interest can be presented with no request to the user to do special manipulation.

Thus, recommendation information about the contents related only to information such as the content or cast in which the user is interested just now is displayed on the display device 11, and information that indicates the contents with no relation is not displayed. Therefore, the user sees the displayed recommendation information to readily find the contents of his/her favorites or the contents that the user desires to watch.

For example, in the case in which the user is interested in the contents related to sports, the user only focuses attention on the information relating to sports with the cursor for selection among the items of information relating to the contents on the screen displayed on the display part 166 (for example, the program column on the program guide 41), whereby recommendation information about the other contents related to sports is displayed on the screen displayed on the display part 166. Thus, the user can readily find the contents in which the user is interested from the displayed recommendation information. In addition to this, since recommendation information about the contents not related to sports is not displayed, the user can readily find the contents in which the user is interested.

In addition, the screen on which information relating to the content is displayed is displayed on the display device 11, and then focused content information is supplied from the display device 11 to the recording and reproducing apparatus 12. Thus, the recording and reproducing apparatus 12 uses the supplied focused content information to start a retrieving process that is a process in which the contents having a high degree of relation to the focused content information are retrieved. Hereinafter, the retrieving process performed by the recording and reproducing apparatus 12 will be described with reference to a flow chart shown in FIG. 10.

In Step S71, the communicating part 197 acquires focused content information from the display device 11, and supplies the acquired focused content information to the control part 195. The control part 195 provides the focused content information supplied from the communicating part 197 to the retrieving part 193, and instructs the retrieving part 193 to retrieve contents.

In Step S72, the retrieving part 193 uses the focused content information supplied from the control part 195 and appearance frequency information recorded in the recording part 192 to retrieve the contents having a high degree of relation to the focused content information among the contents before broadcast, the contents taped and recorded in the recording and reproducing apparatus 12, and the contents distributed through the content distribution apparatus. In other words, the retrieving part 193 considers the contents before broadcast, the contents taped and recorded in the recording and reproducing apparatus 12, and the contents distributed through the content distribution apparatus to be targets for retrieval, and uses appearance frequency information and focused content information about the contents to be the targets for retrieval to retrieve the contents having a high degree of relation.

For example, in the case in which the option screen 81 shown in FIG. 3 is displayed on the display device 11 and focused content information includes information that indicates the cast "Pecky" selected by the cursor 91, the retrieving part 193 retrieves appearance frequency information including the word "Pecky" in appearance frequency information recorded in the recording part 192. In addition, as the result of retrieval, in the case in which the number of items of appearance frequency information exceeding a predetermined number of items of appearance frequency information is obtained, the retrieving part 193 selects a predetermined number of items of appearance frequency information from the appearance frequency information of the result of retrieval in descending order of the frequency of appearance of the word "Pecky", and considers the selected appearance frequency information to be the final appearance frequency information obtained as the result of retrieval. Then, the retrieving part 193 considers the contents specified by the appearance frequency information of the result of retrieval, that is, the contents specified by the content information corresponding to the appearance frequency information obtained by retrieval to be the contents having high relation to the focused content information.

In addition, for example, in the case in which the program guide 41 shown in FIG. 2 is displayed on the display device 11 and focused content information does not include information relating to the contents such as cast selected by the cursor, the appearance frequency information generating part 212 of the retrieving part 193 applies morphological analysis to each of the text strings indicating the title of the content, the explanation of the descriptions, and the cast in the supplied focused content information, and generates appearance frequency information for focused content information.

Then, the retrieving part 193 uses the appearance frequency information for the focused content information and appearance frequency information recorded in the recording part 192, and finds the evaluation value that indicates the level of degree of relation to focused content information for every contents specified by the appearance frequency information recorded in the recording part 192. More specifically, the retrieving part 193 derives the product of the frequency of appearance included in the appearance frequency information recorded in the recording part 192 and the frequency of appearance included in the appearance frequency information for the focused content information for the words also included in the appearance frequency information for the focused content information among the words included in appearance frequency information recorded in the recording part 192, and determines the derived sum of the derived products as an evaluation value.

Therefore, for example, in the case in which appearance frequency information for focused content information includes the word "Saba" and the frequency of appearance "2" of that word, and the word "golf" and the frequency of appearance "1" of that word, the evaluation value of the content specified by appearance frequency information shown in FIG. 8 is the sum of the products of the frequencies of appearance of the words "Saba" and "golf" included in common with two items of appearance frequency information.

In other words, the words included in both of the appearance frequency information for the focused content information and the appearance frequency information shown in FIG. 8 recorded in the recording part 192 are the words "Saba" and "golf". Then, the retrieving part 193 finds a product 6 (=2×3) of the frequency "2" of appearance of the word "Saba" included in the appearance frequency information for the focused content information and the frequency of appearance "3" of the word "Saba" included in the appearance frequency information recorded in the recording part 192, finds a product 2 (=1×2) of the frequency of appearance "1" of the word "golf" included in the appearance frequency information for the focused content information and the frequency of appearance "2" of the word "golf" included in the appearance frequency information recorded in the recording part 192, and then determines 8 (=6+2), which is the sum of these products, as the evaluation value of the content specified by appearance frequency information shown in FIG. 8. More specifically, the evaluation value of the contents becomes higher, as content information contains a greater number of words included in focused content information.

In this manner, when the evaluation value is determined for every content to be a target for retrieval, the retrieving part 193 selects a predetermined number of contents from these contents in descending order of the evaluation values, and determines the selected contents to be the contents having a high degree of relation to the focused content information obtained as the result of retrieval. In addition, such a scheme may be possible in which a threshold is set for the evaluation value in advance, and only the contents having the evaluation value equal to or greater than a threshold are selected as the contents having a high degree of relation to focused content information. Moreover, such a scheme may be possible in which the contents with content information including a greater number of words contained in focused content information are simply selected as the contents having a high degree of relation.

In addition, in the case in which appearance frequency information recorded in the recording part 192 includes information that indicates the genre to which the contents belong, the genre may be used for retrieval. In other words, the retrieving part 193 retrieves appearance frequency information including information that indicates the same genre as the genre included in focused content information in appearance frequency information recorded in the recording part 192, and determines the contents specified by the resulted appearance frequency information to be the contents having a high degree of relation to the focused content information.

In this manner, the retrieving part 193 uses focused content information and appearance frequency information recorded in the recording part 192 (content information) to retrieve the contents having a high degree of relation to the focused content information. In addition, in the case in which a predetermined number of contents or greater are not retrieved as the result of retrieval, such contents as the contents having the same title as that of the content indicated by focused content information to be broadcast one week later, the contents to be broadcast soon, and the content recorded lately may be the resulted contents of retrieval.

When the retrieving part 193 retrieves the contents related to the focused content information, in Step S73, the recommendation information generating part 213 of the retrieving part 193 generates recommendation information about the resulted contents of retrieval. For example, the recommendation information generating part 213 acquires content information about the resulted contents of retrieval from the recording part 192 as necessary, and uses the acquired content information to generate recommendation information formed of the title, broadcast date and time, channel, and thumbnail image of the content. The retrieving part 193 supplies the generated recommendation information to the communicating part 197 through the control part 195.

In Step S74, the communicating part 197 provides recommendation information supplied from the retrieving part 193 to the display device 11.

In Step S75, the control part 195 determines whether a new item of focused content information is supplied from the display device 11 to the communicating part 197. In Step S75, if it is determined that a new item of focused content information is supplied, the process returns to Step S71, and the process steps described above are repeated.

In contrast to this, in Step S75, if it is determined that focused content information is not supplied, the process goes to Step S76. The control part 195 determines whether any process is instructed for the content indicated by recommendation information displayed on the display part 166. For example, in the case in which a request is made to make a preselect for recording of the content indicated by the recommendation information, to supply a content, and to purchase a content from the display device 11 to the control part 195 through the communicating part 197, it is determined that a process is instructed for the content.

In Step S76, if it is determined that no process is instructed for the content, the process goes to Step S77. The control part 195 determines whether the process for retrieving is ended the contents. For example, in the case in which a signal telling that the process is ended is supplied from the display device 11 to the control part 195 through the communicating part 197, it is determined that the process is ended.

In Step S77, if it is determined that the process is not ended, the process returns to Step S75, and the process steps described above are repeated.

In contrast to this, in Step S77, if it is determined that the process is ended, the individual blocks of the recording and reproducing apparatus 12 end their performing processes, and then the retrieving process is ended.

In addition, in Step S76, if it is determined that a process is instructed for the content, in Step S78, the recording and reproducing apparatus 12 performs the process in accordance with the request from the display device 11. In other words, in accordance with the request from the display device 11, the control part 195 controls the individual blocks of the recording and reproducing apparatus 12 to perform the process requested by the display device 11, and then the retrieving process is ended.

For example, in the case in which the display device 11 makes a request to supply a content taped and recorded in the recording part 192, the control part 195 acquires the requested content and content information about the content from the recording part 192, and supplies the acquired content and the content information to the display device 11 through the communicating part 197.

In addition, for example, in the case in which the display device 11 makes a request to make a preselect for recording of the content, the control part 195 instructs the recording control part 211 of the content acquiring part 191 to make a preselect for recording of the requested content in accordance with the request to make a preselect for recording from the display device 11. Then, when it is the time to broadcast the content that a preselect is made for recording, the recording control part 211 supplies the content that a preselect is made for recording and content information about the content acquired by the content acquiring part 191 to the recording part 192 for recording.

Moreover, for example, in the case in which the display device 11 makes a request to purchase a content from the content distribution apparatus, the control part 195 performs the process for purchasing the requested content as necessary, and acquires the content purchased from the content distribution apparatus through the communicating part 196 and the content acquiring part 191. Then, the control part 195 supplies the acquired content to the display device 11 through the communicating part 197.

In this manner, the recording and reproducing apparatus 12 uses the focused content information supplied from the display device 11 and the recorded appearance frequency information to retrieve the contents having a high degree of relation to the focused content information, and generates recommendation information that indicates the resulted contents.

As described above, the contents having a high degree of relation to the focused content information are retrieved, and recommendation information that indicates the resulted contents is generated, whereby information that indicates the contents related to the content in which the user is interested can be presented to the user.

In addition, as discussed above, it is described that the contents are retrieved in the recording and reproducing apparatus 12. However, such a scheme may be possible in which the retrieving part 193 is provided on the display device 11 to retrieve contents in the display device 11. In addition, such a scheme may be possible in which in the recording and reproducing apparatus 12, it is allowed to know what screen is displayed on the display device 11, and the recording and reproducing apparatus 12 generates focused content information. In this case, for example, the recording and reproducing apparatus 12 receives a control signal from the remote commander, and the recording and reproducing apparatus 12 instructs the display device 11 to display various screens in accordance with the received control signal.

Moreover, it is described that appearance frequency information recorded in the recording part 192 is used to retrieve contents. However, such a scheme may be possible in which at the point in time at which it is instructed to retrieve contents, appearance frequency information is generated for content information recorded in the recording part 192 to retrieve the contents. Furthermore, in addition to the descriptions and cast of the content, content information may include information relating to the director, scenario, location, and theme song of a movie as a content. In this case, for example, these items of information may be acquired individually by the content acquiring part 161 or the content acquiring part 191, or alternatively, these items of information may be included in the detail of the content together with information such as cast. In addition, these items of information may be used to generate appearance frequency information or focused content information.

Figure 11:
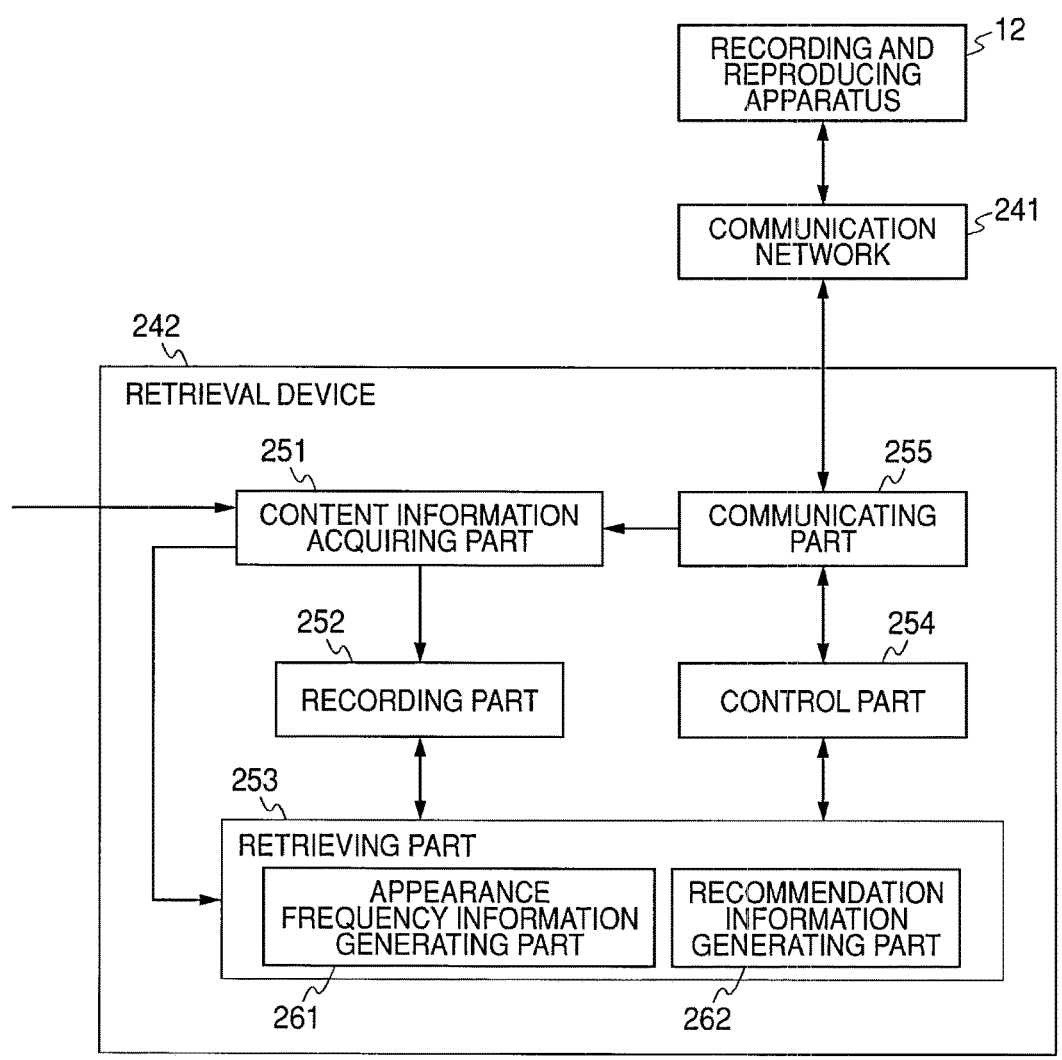
FIG. 11 shows a block diagram depicting an exemplary configuration of a retrieval device.

Moreover, such a scheme may be possible in which the recording and reproducing apparatus 12 makes a request to another device connected via the communication network to retrieve contents, and the contents are retrieved in another device. In this case, for example, as shown in FIG. 11, to the recording and reproducing apparatus 12, a retrieval device 242 is connected that retrieves contents via the communication network 241.

The control part 195 of the recording and reproducing apparatus 12 sends focused content information supplied from the display device 11 to the retrieval device 242 through the communicating part 196 and the communication network 241. The retrieval device 242 receives the focused content information sent from the recording and reproducing apparatus 12, and uses the received focused content information to retrieve the contents.

The retrieval device 242 is configured of a content information acquiring part 251, a recording part 252, a retrieving part 253, a control part 254, and a communicating part 255.

The content information acquiring part 251 acquires content information by receiving content information sent from the broadcast station, not shown, or by acquiring through the communicating part 255 content information sent from the content distribution apparatus via the communication network 241. Then, the content information acquiring part 251 supplies and records the acquired content information in the recording part 252 as well as supplies it to the retrieving part 253.

The recording part 252 records therein content information supplied from the content information acquiring part 251 and appearance frequency information supplied from the retrieving part 253. The retrieving part 253 uses the focused content information supplied from the control part 254 and the appearance frequency information recorded in the recording part 252 to retrieve the contents having a high degree of relation to the focused content information.

In addition, the retrieving part 253 has an appearance frequency information generating part 261 and a recommendation information generating part 262. The appearance frequency information generating part 261 of the retrieving part 253 uses the content information supplied from the content information acquiring part 251 to generate appearance frequency information about the content information, and supplies and records the generated appearance frequency information in the recording part 252. The recommendation information generating part 262 uses the content information recorded in the recording part 252 to generate recommendation information about the contents obtained as the result of retrieval done by the retrieving part 253 as necessary.

The control part 254 controls the overall retrieval device 242. In addition, the control part 254 provides the focused content information supplied from the recording and reproducing apparatus 12 through the communicating part 255 to the retrieving part 253, and instructs it to retrieve the related contents. Furthermore, the control part 254 provides the recommendation information supplied from the retrieving part 253 to the communicating part 255.

The communicating part 255 receives the content information sent from the content distribution apparatus via the communication network 241 and supplies it to the content information acquiring part 251, or receives the focused content information sent from the recording and reproducing apparatus 12 via the communication network 241 and supplies it to the control part 254. In addition, the communicating part 255 sends the recommendation information supplied from the control part 254 to the recording and reproducing apparatus 12 via the communication network 241.

Figure 12:
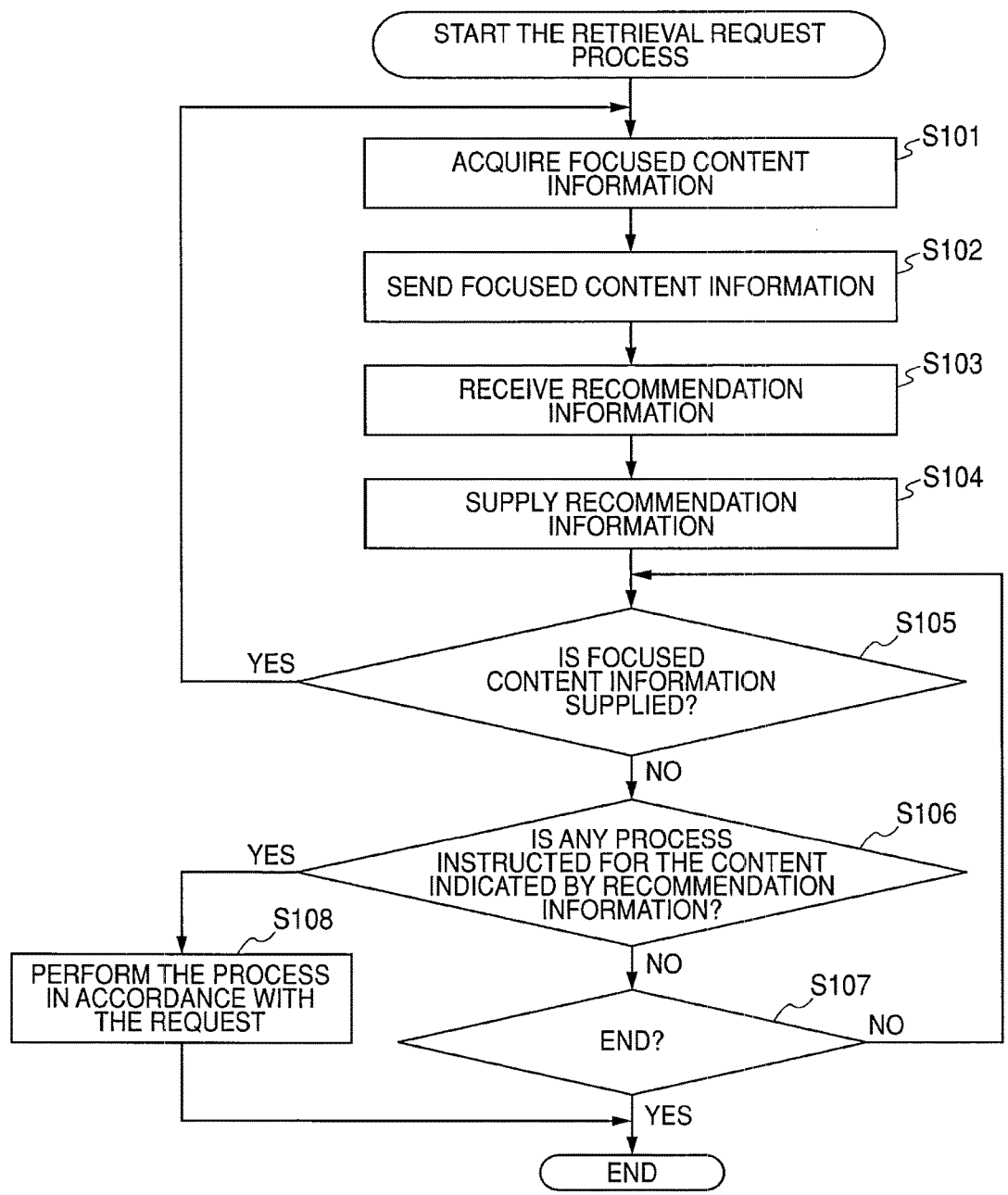
FIG. 12 shows a flow chart illustrative of a retrieval request process.

As described above, in the case in which the recording and reproducing apparatus 12 makes a request to the retrieval device 242 to retrieve the contents, the screen on which the information relating to the content is displayed is displayed on the display device 11 and the display device 11 supplies focused content information to the recording and reproducing apparatus 12. Then, the recording and reproducing apparatus 12 starts a retrieval request process that is a process in which a request is made for the retrieval device 242 to retrieve the contents. Hereinafter, the retrieval request process performed by the recording and reproducing apparatus 12 will be described with reference to a flow chart shown in FIG. 12.

In Step S101, the communicating part 197 acquires focused content information from the display device 11, and supplies it to the control part 195. Then, the control part 195 provides the focused content information supplied from the communicating part 197 to the communication network 196.

In Step S102, the communicating part 196 sends the focused content information supplied from the control part 195 to the retrieval device 242 via the communication network 241. In addition, more specifically, the control part 195 further makes a request to the retrieval device 242 to retrieve contents. Then, the retrieval device 242 sends recommendation information that indicates the contents having a high degree of relation to the sent focused content information to the recording and reproducing apparatus 12.

In Step S103, the communicating part 196 receives the recommendation information sent from the retrieval device 242, and supplies it to the control part 195. The control part 195 provides the recommendation information supplied from the communicating part 196 to the communicating part 197.

In Step S104, the communicating part 197 provides the recommendation information supplied from the control part 195 to the display device 11. After that, the process in Step S105 to the process in Step S108 are performed, but these processes are the same as the process in Step S75 to the process in Step S78 shown in FIG. 10, omitting the descriptions.

In this manner, when focused content information is supplied from the display device 11, the recording and reproducing apparatus 12 provides the focused content information to the retrieval device 242, and makes a request to the retrieval device 242 to retrieve the contents. Then, the retrieval device 242 sends recommendation information about the contents obtained as the result of retrieval, and then the recording and reproducing apparatus 12 receives the recommendation information, and supplies it to the display device 11.

Figure 13:
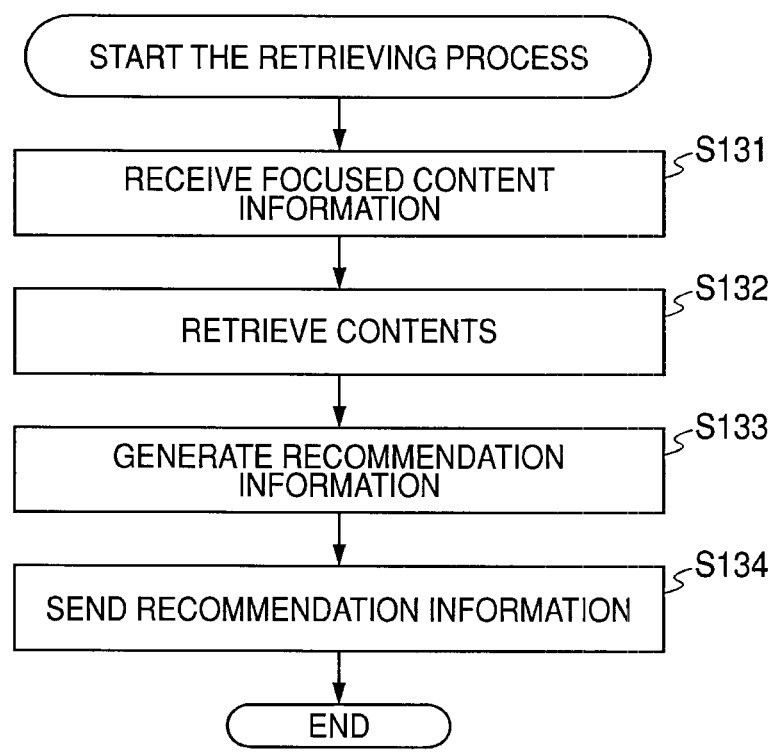
FIG. 13 shows a flow chart illustrative of a retrieving process.

In addition, when the recording and reproducing apparatus 12 sends the focused content information to the retrieval device 242, the retrieval device 242 receives the sent focused content information, and starts a retrieving process that is a process in which the contents related to the focused content information are retrieved. Hereinafter, the retrieving process performed by the retrieval device 242 will be described with reference to a flow chart shown in FIG. 13.

In Step S131, the communicating part 255 receives the focused content information sent from the recording and reproducing apparatus 12, and supplies it to the control part 254. The control part 254 provides the focused content information supplied from the communicating part 255 to the retrieving part 253 as well as instructs the retrieving part 253 to retrieve the contents.

In Step S132, in accordance with the instruction from the control part 254, the retrieving part 253 uses the focused content information and the appearance frequency information recorded in the recording part 252 to retrieve the contents having a high degree of relation to the focused content information. At this time, the appearance frequency information generating part 261 generates appearance frequency information for the focused content information as necessary, and the retrieving part 253 uses the appearance frequency information for the focused content information to retrieve the contents as necessary.

In Step S133, the recommendation information generating part 262 generates recommendation information about the resulted contents of retrieval done by the retrieving part 253. Then, the retrieving part 253 supplies the generated recommendation information to the communicating part 255 through the control part 254.

In Step S134, the communicating part 255 sends the recommendation information supplied from the control part 254 to the recording and reproducing apparatus 12, and then the retrieving process is ended.

In this manner, every time when focused content information is sent from the recording and reproducing apparatus 12, the retrieval device 242 retrieves the contents related to the focused content information.

Figure 14:
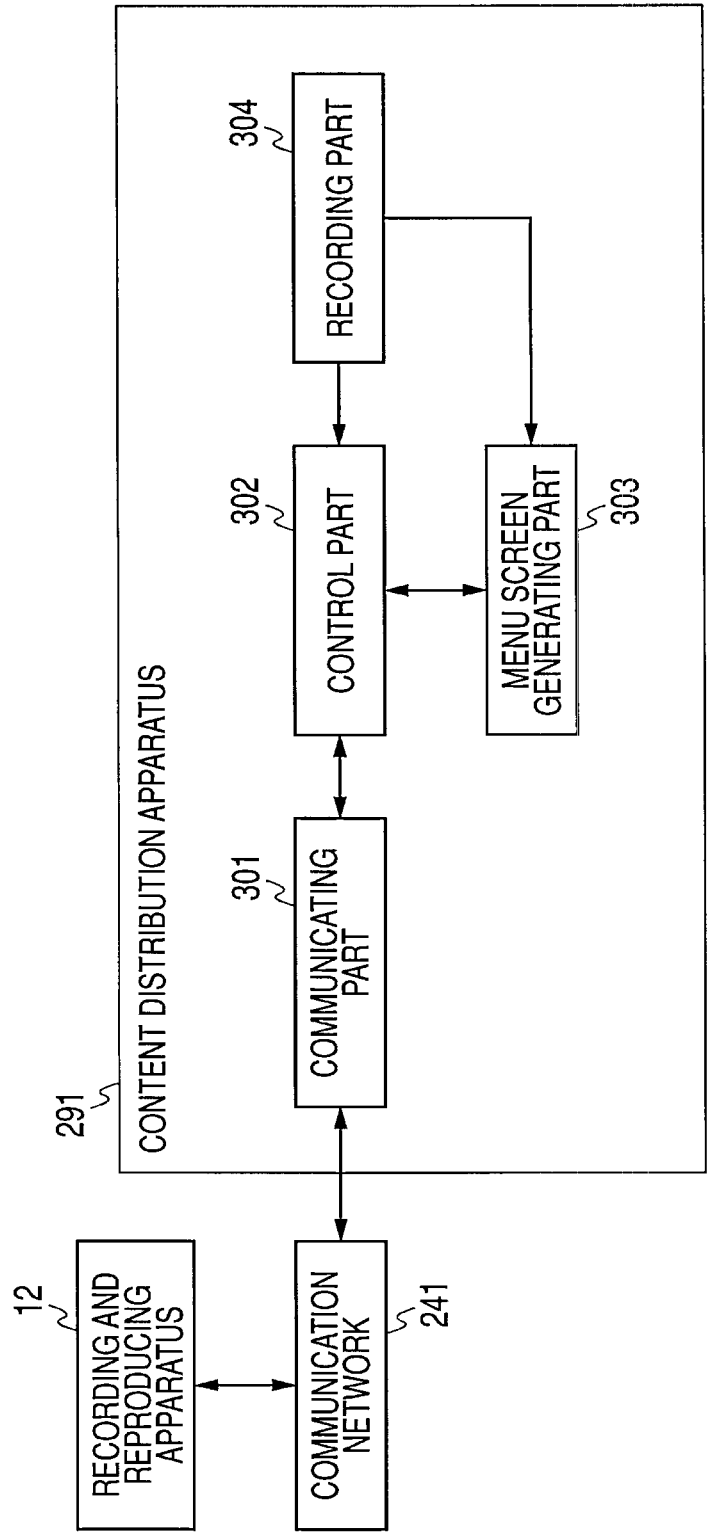
FIG. 14 shows a block diagram depicting an exemplary configuration of a content distribution apparatus.

In addition, in the case in which in the display device 11, a menu screen for the list of the contents distributed by the content distribution apparatus is to be displayed thereon, the menu screen to be displayed on the display device 11 is sometimes generated by the content distribution apparatus. In this case, for example, as shown in FIG. 14, the recording and reproducing apparatus 12 communicates with the content distribution apparatus 291 via the communication network 241, whereby various screens and contents are sent and received. In addition, in FIG. 14, the blocks corresponding to those in FIG. 11 are designated the same numerals and signs, omitting the descriptions.

The content distribution apparatus 291 is configured of a communicating part 301, a control part 302, a menu screen generating part 303, and a recording part 304.

The communicating part 301 communicates with the recording and reproducing apparatus 12 via the communication network 241, and sends and receives menu screens and contents. When a request to send a menu screen is supplied from the recording and reproducing apparatus 12 through the communicating part 301, the control part 302 instructs the menu screen generating part 303 to generate a menu screen. In addition, when a request is made to send contents or content information from the recording and reproducing apparatus 12 through the communicating part 301, the control part 302 acquires the requested contents or content information from the recording part 304, and supplies them to the communicating part 301.

In accordance with the instruction from the control part 302, the menu screen generating part 303 properly uses data recorded in the recording part 304 to generate a predetermined menu screen. The recording part 304 records therein contents and content information.

In the case in which the content distribution apparatus 291 like this generates the menu screen and sends it to the recording and reproducing apparatus 12, the recording and reproducing apparatus 12 is instructed to supply the menu screen by the user, and then acquires the menu screen from the content distribution apparatus 291 as well as starts a retrieving process that is a process for generating recommendation information about the contents related to information relating to the content selected by the cursor on the menu screen.

In other words, when the user manipulates the remote commander to instruct the display of the menu screen and then the input accepting part 194 supplies a control signal in accordance with the user manipulation to the control part 195, the retrieving process is started. Hereinafter, the retrieving process performed by the recording and reproducing apparatus 12 will be described with reference to a flow chart shown in FIG. 15.

In Step S161, the control part 195 makes a request to the content distribution apparatus 291 to generate a menu screen. In other words, the control part 195 supplies a request to generate a menu screen to the communicating part 196, and the communicating part 196 sends the request from the control part 195 to the content distribution apparatus 291 via the communication network 241. Then, in accordance with the request, the content distribution apparatus 291 sends the menu screen to the recording and reproducing apparatus 12.

In Step S162, the communicating part 196 receives the menu screen sent from the content distribution apparatus 291, and supplies the received menu screen to the control part 195. The control part 195 provides the menu screen supplied from the communicating part 196 to the display device 11 through the communicating part 197. Then, the supplied menu screen is provided to the communicating part 167 of the display device 11, and then to the control part 164 and the display part 166 through the display control part 165, and the menu screen is displayed on the display part 166.

Here, for example, the menu screen displayed on the display part 166 is the list of the titles of the contents distributed by the content distribution apparatus 291, and on the menu screen, a cursor is displayed that selects the titles of the contents displayed thereon.

In Step S163, the control part 195 makes a request to the content distribution apparatus 291 to send the content specified by information selected with the cursor on the menu screen, for example, the content information about the content indicated by the title selected by the cursor. In other words, the control part 195 supplies a request to send content information to the communicating part 196, and the communicating part 196 sends the request from the control part 195 to the content distribution apparatus 291 via the communication network 241. Then, in accordance with the request, the content distribution apparatus 291 sends content information to the recording and reproducing apparatus 12.

In Step S164, the communicating part 196 receives the content information sent from the content distribution apparatus 291, and supplies it to the control part 195. The control part 195 considers the content indicated by the information selected with the cursor on the menu screen to be a focused content, and uses the content information supplied from the communicating part 196 to generate focused content information. Then, the control part 195 supplies the generated focused content information to the retrieving part 193 as well as instructs the retrieving part 193 to retrieve contents.

In Step S165, the retrieving part 193 uses the focused content information supplied from the control part 195 and appearance frequency information recorded in the recording part 192 to retrieve the contents having a high degree of relation to the focused content information. At this time, the appearance frequency information generating part 212 generates appearance frequency information for the focused content information as necessary, and the retrieving part 193 uses the appearance frequency information for the focused content information to retrieve the contents as necessary.

In Step S166, the recommendation information generating part 213 generates recommendation information about the resulted contents of retrieval done by the retrieving part 193, and supplies the generated recommendation information to the communicating part 197 through the control part 195.

In Step S167, the communicating part 197 provides the recommendation information supplied from the control part 195 to the display device 11. Thus, the recording and reproducing apparatus 12 supplies recommendation information to the display control part 165 through the communicating part 167 and the control part 164. The display control part 165 provides the supplied recommendation information to the display part 166 to control the display part 166 to display the recommendation information on the menu screen displayed on the display part 166. Consequently, on the menu screen displayed on the display part 166, recommendation information about the contents having a high degree of relation to the content indicated by the information selected with the cursor is displayed.

In Step S168, based on the control signal from the input accepting part 194, the control part 195 determines whether the cursor on the menu screen displayed on the display part 166 is instructed to move to the information relating to the focused content. For example, in the case in which the user manipulates the remote commander to instruct the cursor on the menu screen to move to another title of the content, the input accepting part 194 supplies the control signal corresponding to the user manipulation to the control part 195. Thus, the control part 195 determines that the cursor is instructed to move based on the supplied control signal.

In Step S168, if it is determined that the cursor is instructed to move, the control part 195 instructs the display device 11 to move the cursor through the communicating part 197. The process returns to Step S163, and the process steps described above are repeated. In other words, in accordance with the instruction from the recording and reproducing apparatus 12, the control part 164 of the display device 11 instructs the display control part 165 to move the cursor, and the display control part 165 controls the display part 166 to move the cursor in accordance with the instruction by the control part 164. In addition, the recording and reproducing apparatus 12 acquires the content information about the content indicated by information newly selected with the cursor from the content distribution apparatus 291, and uses the acquired content information to generate recommendation information.

In contrast to this, in Step S168, if it is determined that the cursor is not instructed to move, the process goes to Step S169. Based on the control signal from the input accepting part 194, the control part 195 determines whether any process is instructed for the content indicated by recommendation information.

In Step S169, if it is determined that no process is instructed, the process goes to Step S170. Based on the control signal from the input accepting part 194, the control part 195 determines whether the process is ended in which the contents are retrieved to generate recommendation information. For example, when the user manipulates the remote commander to instruct the end of the display of the menu screen and the input accepting part 194 supplies the control signal corresponding to the user manipulation to the control part 195, it is determined that the process is ended.

In Step S170, if it is determined that the process is not ended, the process returns to Step S168, and the process steps described above are repeated.

On the other hand, in Step S170, if it is determined that the process is ended, the control part 195 performs the process in accordance with the manipulation of the remote commander done by the user as well as sends a signal telling that the process is ended to the content distribution apparatus 291 through the communicating part 196, and then the retrieving process is ended.

In addition, in Step S169, if it is determined that a process is instructed, the process goes to Step S171. The recording and reproducing apparatus 12 performs the process in accordance with the user manipulation. In other words, based on the control signal from the input accepting part 194, the control part 195 controls the individual blocks of the recording and reproducing apparatus 12 to perform the process instructed by the user, and then the retrieving process is ended.

For example, in the case in which the user instructs the display of the content indicated by the recommendation information, based on the control signal from the input accepting part 194, the control part 195 instructs the communicating part 196 to communicate the recording and reproducing apparatus 12 with the content distribution apparatus 291 as necessary, for the process necessary to purchase the content.

In addition, the control part 195 supplies a request to send the content instructed by the user for display to the communicating part 196, and the communicating part 196 sends the request from the control part 195 to the content distribution apparatus 291. Then, the content distribution apparatus 291 sends the content to the recording and reproducing apparatus 12 in accordance with the request. Thus, the communicating part 196 receives the content sent from the content distribution apparatus 291, and supplies the received content to the control part 195 through the content acquiring part 191. The control part 195 provides the content supplied from the content acquiring part 191 through the communicating part 197, and displays it on the display device 11.

Moreover, for example, in the case in which the user instructs a preselect for recording of the content indicated by the recommendation information, based on the control signal from the input accepting part 194, the control part 195 instructs the communicating part 196 to communicate the recording and reproducing apparatus 12 with the content distribution apparatus 291 as necessary, for the process necessary to purchase the content. Then, the control part 195 instructs the recording control part 211 of the content acquiring part 191 to make a preselect for recording of the content, and the recording control part 211 makes a preselect for recording of the content in accordance with the instruction from the control part 195.

In this manner, when the user instructs the display of the menu screen, the recording and reproducing apparatus 12 acquires the menu screen and displays it on the display device 11 as well as generates recommendation information about the contents related to the content indicated by the information selected with the cursor on the menu screen. Then, the recording and reproducing apparatus 12 supplies and displays the generated recommendation information on the display device 11.

Figure 15:
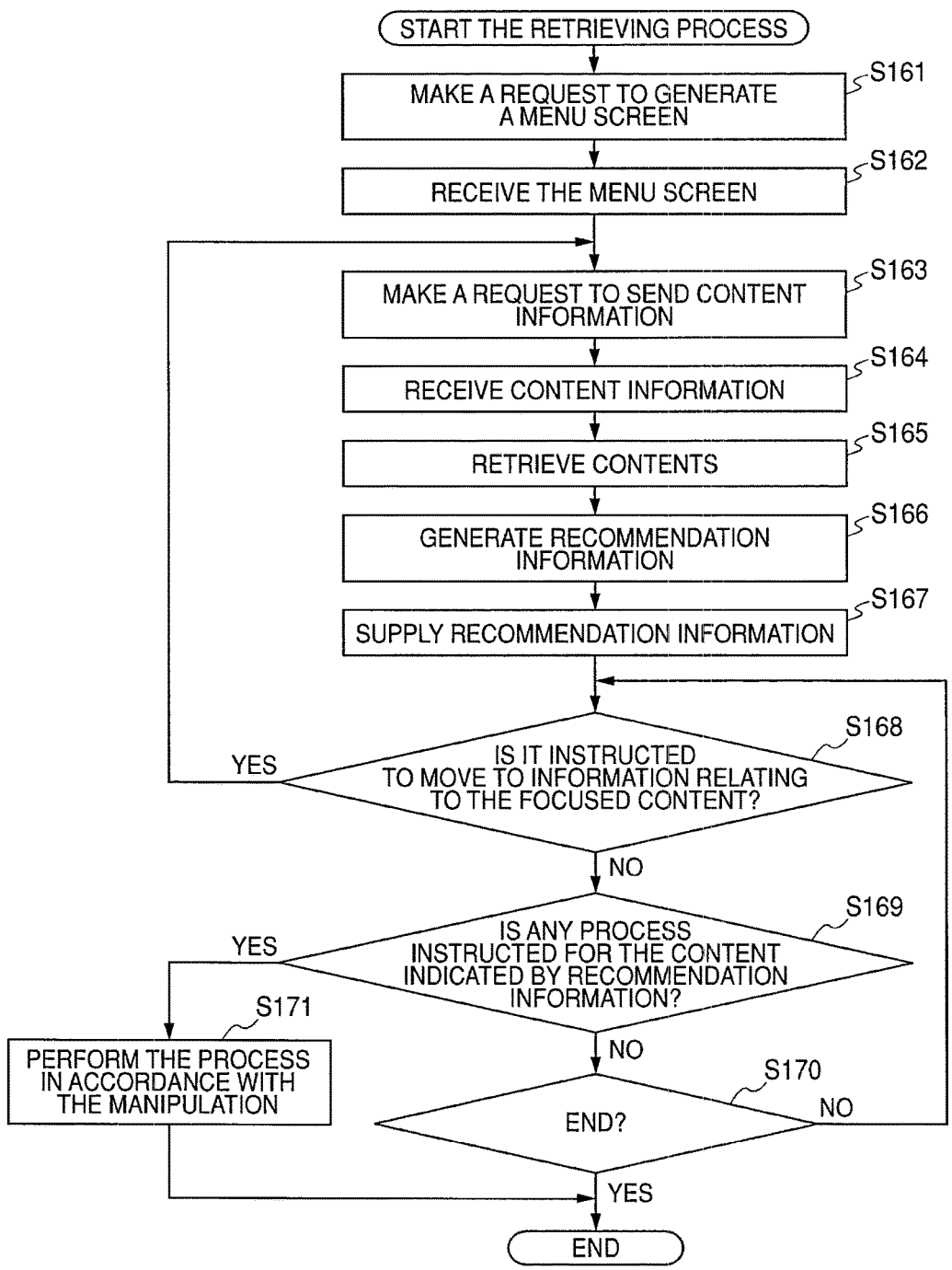
FIG. 15 shows a flow chart illustrative of a retrieving process.
Figure 16:
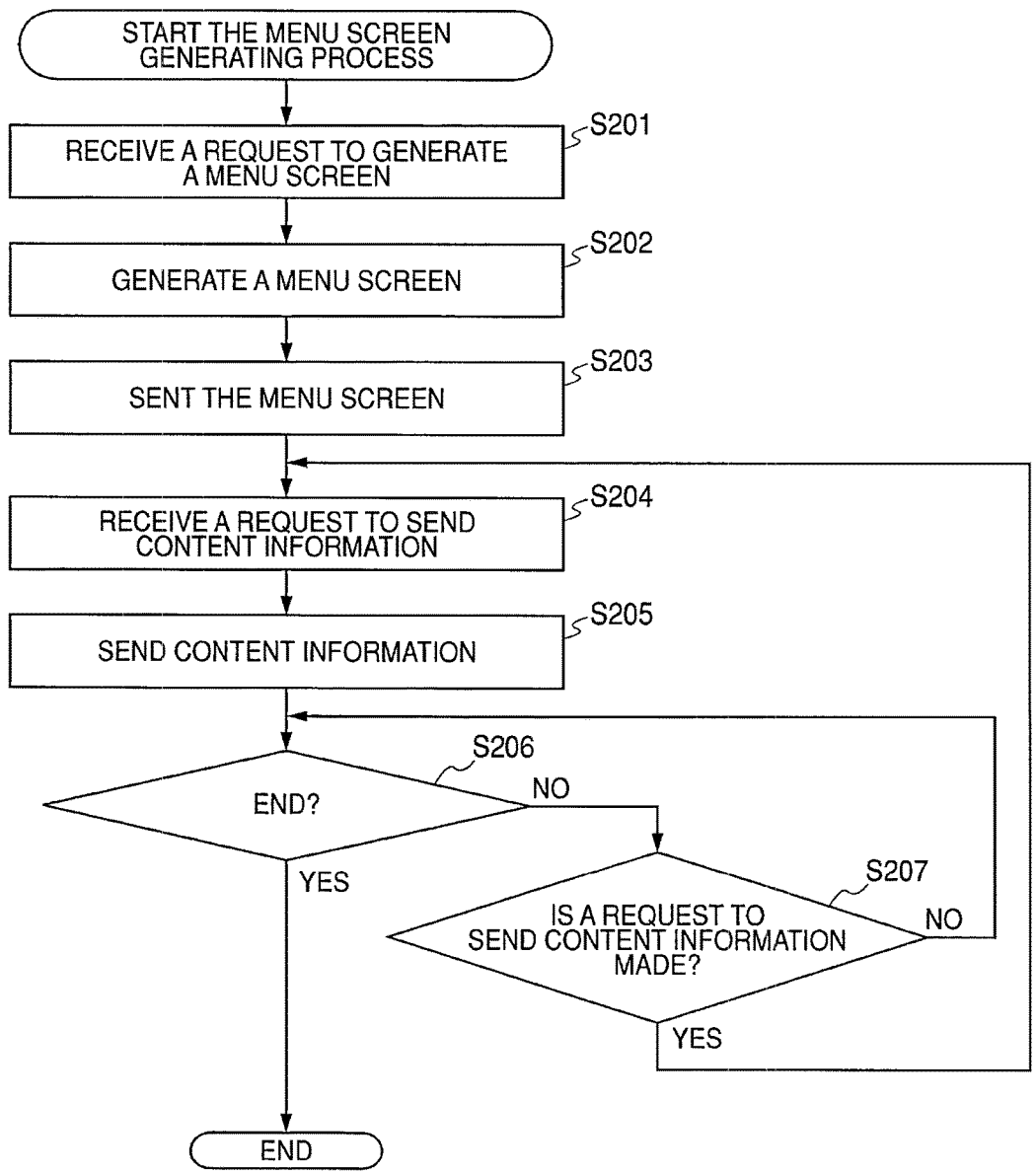
FIG. 16 shows a block diagram depicting a menu screen generating process.

In addition, the recording and reproducing apparatus 12 starts the retrieving process described with reference to FIG. 15, and the recording and reproducing apparatus 12 sends the request to generate a menu screen to the content distribution apparatus 291. Then, the content distribution apparatus 291 starts a menu screen generating process that is a process for generating a menu screen. Hereinafter, the menu screen generating process performed by the content distribution apparatus 291 will be described with reference to a flow chart shown in FIG. 16.

In Step S201, the communicating part 301 receives a request to generate a menu screen sent from the recording and reproducing apparatus 12, and supplies it to the control part 302. The control part 302 provides the request supplied from the communicating part 301 to the menu screen generating part 303 as well as instructs the menu screen generating part 303 to generate a menu screen.

In Step S202, in accordance with the instruction from the control part 302, the menu screen generating part 303 uses data recorded in the recording part 304, as necessary, to generate the menu screen. The menu screen generating part 303 supplies the generated menu screen to the communicating part 301 through the control part 302.

In Step S203, the communicating part 301 sends the menu screen supplied from the control part 302 to the recording and reproducing apparatus 12 via the communication network 241. Then, the recording and reproducing apparatus 12 sends the request to send content information in accordance with the process in Step S163 shown in FIG. 15 to the content distribution apparatus 291.

In Step S204, the communicating part 301 receives the request to send content information sent from the recording and reproducing apparatus 12, and supplies the received request to the control part 302. In accordance with the request to send content information supplied from the communicating part 301, the control part 302 acquires the requested content information from the recording part 304, and supplies the acquired content information to the communicating part 301.

In Step S205, the communicating part 301 sends the content information supplied from the control part 302 to the recording and reproducing apparatus 12 via the communication network 241.

In Step S206, the control part 302 determines whether the process for generating the menu screen is ended. For example, in the case in which a signal telling that the process is ended is sent to the content distribution apparatus 291 from the recording and reproducing apparatus 12, or in the case in which the request to send the content is sent, it is determined that the process is ended.

In Step S206, if it is determined that the process is ended, the control part 302 performs a necessary process, and then the menu screen generating process is ended. For example, in the case in which the communicating part 301 receives the request to send the content sent from the recording and reproducing apparatus 12 and supplies the received request to the control part 302, in accordance with the supplied request, the control part 302 acquires the content from the recording part 304, and supplies it to the communicating part 301. In addition, the communicating part 301 sends the content supplied from the control part 302 to the display device 11.

On the other hand, in Step S206, if it is determined that the process is not ended, the process goes to Step S207. The control part 302 determines whether a request is made to send content information. For example, in the case in which a request to send content information is sent to the communicating part 301 from the recording and reproducing apparatus 12, it is determined that a request is made to send content information.

In Step S207, if it is determined that no request is made to send content information, the process returns to Step S206, and the process steps described above are repeated.

In contrast to this, in Step S207, if it is determined that a request is made to send content information, the process returns to Step S204, and the requested content information is sent to the recording and reproducing apparatus 12.

In this manner, in accordance with the request from the recording and reproducing apparatus 12, the content distribution apparatus 291 generates a menu screen, and sends it to the recording and reproducing apparatus 12. In addition, in accordance with the request from the recording and reproducing apparatus 12, the content distribution apparatus 291 sends content information and a content to the recording and reproducing apparatus 12.

In addition, as discussed above, it is described that the appearance frequency information generating process described with reference to FIG. 7, and the retrieving process described with reference to FIG. 10 are performed by the recording and reproducing apparatus 12. However, these processes may be performed by the display device 11. In addition, the contents are not restricted to the moving images, which may be sounds such as music.

Moreover, in the case in which the retrieving part 193 retrieves the contents having a high degree of relation to the focused content information, such a scheme may be possible in which taste information is used that indicates user's tastes generated from a plurality of contents that the user instructs watching and recording such as the contents watched by the user in the past, and the contents that are instructed to watch or to be a preselect for recording by selecting recommendation information. In this case, for example, the taste information may be the frequency of appearance included in the word contained in content information about the contents watched or recorded in the past, or may be a word or a genre inputted by the user in advance. In addition, in this case, for example, the retrieving part 193 weights the individual words included in appearance frequency information for the focused content information depending on taste information.

Moreover, in addition, in the case in which for the screen on which information relating to the content is displayed, such a screen is displayed on the display part 166 as a screen to cancel the purchase of a content, a screen to cancel a preselect for recording, and a screen to delete the recorded content, such a scheme may be possible in which such contents are retrieved that have a low degree of relation to the content specified by the information relating to the contents displayed on that screen, and then recommendation information about the resulted contents is displayed.

More specifically, for example, the retrieving part 193 retrieves the contents specified by information relating to the contents on the screen displayed on the display part 166, that is, the contents that a preselect for recording is cancelled, or the contents having content information that does not include the genres or the words contained in focused content information about the deleted contents, in content information about the contents estimated to be user's favorites that are specified by the contents to be broadcast soon, the latest recorded contents, the contents newly distributed by the content distribution apparatus 291, and taste information. Then, the recommendation information generating part 213 of the retrieving part 193 generates recommendation information about the resulted contents of retrieval.

Moreover, for example, in the case in which the recorded content is deleted, such a scheme may be possible in which when the content to be deleted is content that has been watched for a predetermined time period or longer, recommendation information about the contents having a high degree of relation to the focused content information about that content is generated, whereas when the content to be deleted is a content that has not been watched for a predetermined time period or longer, recommendation information about the contents having a low the degree of relation to focused content information about that content is generated.

Moreover, in addition, such a scheme may be possible in which a related word dictionary is recorded in the display device 11 or the recording and reproducing apparatus 12, and the dictionary is used for generating focused content information or appearance frequency information for focused content information. Here, the related word dictionary is data by which for a predetermined word, words related to that word can be retrieved and obtained. Therefore, for example, for a word "Takeo Kimura" indicating a predetermined person name, the related word dictionary is used to retrieve and obtain the other words related to the word "Takeo Kimura" such as a word "Kimu-Take" indicating another name of the person identified by the word "Takeo Kimura", and a word "SMOP" indicating the name of a group to which "Takeo Kimura" belongs.

Then, for example, in the case in which appearance frequency information is generated for the focused content, the appearance frequency information generating part 212 uses the related word dictionary to retrieve the words related to the extracted word for the word extracted from focused content information, and generates appearance frequency information that includes the resulted words, the extracted word, and the frequencies of appearance of the resulted words and the extracted word.

In addition, similarly, also in the case in which focused content information is generated, the control part 164 uses the related word dictionary to retrieve the related words for the words included in the title of the content to be contained in the focused content, or the words such as the cast selected with the cursor, and includes the resulted words in the focused content.

A sequence of the process steps described above may be executed by hardware, or may be executed by software. In the case in which a series of the process steps is executed by software, a program configuring the software is installed in a computer incorporated in a dedicated hardware, or is installed from a program recording medium to a multipurpose personal computer, for example, that can run various functions by installing various programs.

FIG. 17 shows a block diagram depicting an exemplary hardware configuration of a computer that executes the sequence of the process steps described above by a program.

In the computer, a CPU (Central Processing Unit) 401, a ROM (Read Only Memory) 402, and a RAM (Random Access Memory) 403 are connected to each other through a bus 404.

Furthermore, to the bus 404, an input/output interface 405 is connected. To the input/output interface 405, the following components are connected: an input part 406 formed of a keyboard, a mouse, and a microphone, an output part 407 formed of a display and a speaker, a recording part 408 formed of a hard disk or a non-volatile memory, a communicating part 409 formed of a network interface, the magnetic disk, a drive 410 that drives a removable medium 411 such as an optical disk, a magneto-optical disk, or a semiconductor memory.

In the computer thus configured, for example, the CPU 401 loads a program recorded in the recording part 408 to the RAM 403 through the input/output interface 405 and the bus 404 for execution, whereby the sequence of the process steps described above is executed.

For example, the program executed by the computer (the CPU 401) is offered by recording it on the removable medium 411 that is a package medium formed of a magnetic disk (including a flexible disk), an optical disk (CD-ROM (Compact Disc-Read Only Memory), and DVD), a magneto-optical disk, or a semiconductor memory, or via a cable or wireless transmission medium such as a local area network, the Internet, and digital satellite broadcasting.

Then, the program can be installed on the recording part 408 through the input/output interface 405 by mounting the removable medium 411 on drive 410. In addition, the program can be installed on the recording part 408 by receiving it by the communicating part 409 via a cable or wireless transmission medium. In addition to these, the program can be installed on the ROM 402 or the recording part 408 in advance.

In addition, the program executed by the computer may be a program in which the process steps are performed in a time series in order described in the specification, or a program in which the process steps are performed in parallel, or at a necessary timing when called, for example.

Moreover, the invention is not limited to the embodiments described above, which can be modified within the scope not deviating from the teaching of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
    a processor; and
    a memory coupled to the processor, and comprising instructions, which, when the instructions are executed by the processor, cause the processor to:
        acquire focused content information that relates to a selected content and comprises at least a genre and a title of the selected content, wherein the selected content is selected by a user via a cursor that interacts with a program guide showing a plurality of content items, the cursor being used to select one of the plurality of content items;
        use content information about a plurality of other contents, different from the selected content, to retrieve a content having a high degree of relation to the focused content information acquired from the selected content;
        generate specification information based on the result of retrieval; and
        display, simultaneously, at least one of the genre and the title of the selected content of the focused content information and the specification information, wherein the specification information is overlaid on the program guide and contains recommendations for a plurality of content options.

2. The information processing apparatus according to claim 1, wherein the plurality of other contents are related to content retrieved from at least one of internet or digital satellite broadcasting.

3. The information processing apparatus according to claim 1, wherein the selected content is related to content retrieved from at least one of internet or digital satellite broadcasting.

4. The information processing apparatus according to claim 1, wherein the memory comprises instructions, which, when executed by the processor, cause the processor to:
control execution of any one of a process for watching a content specified by the displayed specification information, a process for making a preselect for watching, a process for recording, a process for making a preselect for recording, or a process for purchase in accordance with a user instruction.

5. The information processing apparatus according to claim 1, wherein the memory comprises instructions, which, when executed by the processor, cause the processor to:
control display of information relating to each of a plurality of contents.

6. The information processing apparatus according to claim 5, wherein each of the plurality of contents is related to content retrieved from at least one of the internet or digital satellite broadcasting.

7. A method for processing information performed by an information processing apparatus, the method comprising the steps of:
acquiring focused content information that relates to a selected content and comprises at least a genre and a title of the selected content, wherein the selected content is selected by a user via a cursor that interacts with a program guide showing a plurality of content items, the cursor being used to select one of the plurality of content items;
using content information about a plurality of other contents, different from the selected content to retrieve a content having a high degree of relation to the focused content information acquired from the selected content;
generating specification information based on the result of retrieval; and
displaying, simultaneously, at least one of the genre and the title of the selected content of the focused content information and the specification information, wherein the specification information is overlaid on the program guide and contains recommendations for a plurality of content options.

8. A non-transitory computer readable storage medium having a computer program stored thereon which when executed by a computer cause the computer to execute processing including the steps of:
acquiring focused content information that relates to a selected content and comprises at least a genre and a title of the selected content, wherein the selected content is selected by a user via a cursor that interacts with a program guide showing a plurality of content items, the cursor being used to select one of the plurality of content items;
using content information about a plurality of other content, different from the selected content, to retrieve a content having a high degree of relation to the focused content information acquired from the selected content;
generating specification information based on the result of retrieval; and
displaying, simultaneously, at least one of the genre and the title of the selected content of the focused content information and the specification information, wherein the specification information is overlaid on the program guide and contains recommendations for a plurality of content options.

* * * * *